Dec. 7, 1965

S. M. HAMMER 3,222,646

SUPERVISORY REMOTE CONTROL SYSTEM

Filed Aug. 10, 1960

INVENTOR.
SIGWALD M. HAMMER
BY
Adams, Forward and McLean
ATTORNEYS

Dec. 7, 1965  S. M. HAMMER  3,222,646
SUPERVISORY REMOTE CONTROL SYSTEM
Filed Aug. 10, 1960  9 Sheets-Sheet 2
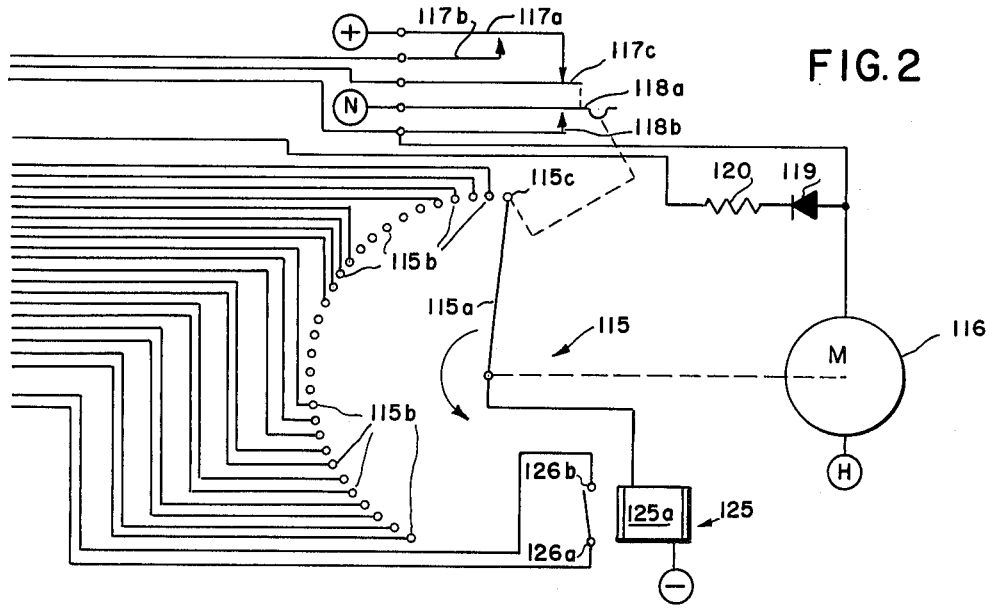
FIG. 2
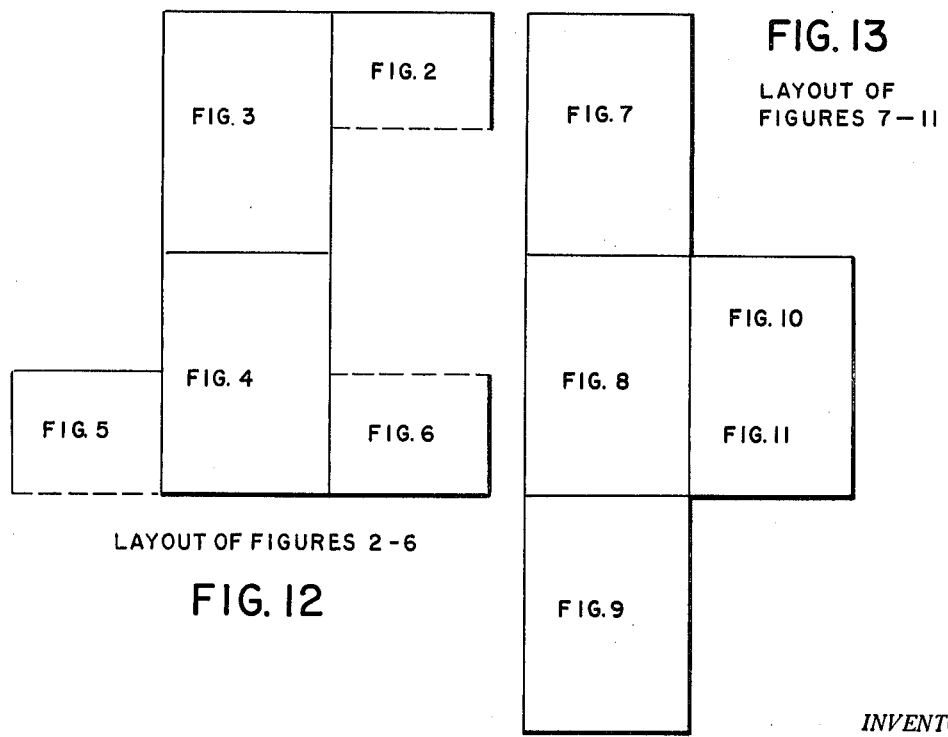
FIG. 13
LAYOUT OF FIGURES 7–11
LAYOUT OF FIGURES 2-6
FIG. 12
INVENTOR.
SIGWALD M. HAMMER
BY
Adams, Forward and McLean
ATTORNEYS

INVENTOR.
SIGWALD M. HAMMER

Dec. 7, 1965  S. M. HAMMER  3,222,646
SUPERVISORY REMOTE CONTROL SYSTEM
Filed Aug. 10, 1960  9 Sheets-Sheet 5

INVENTOR.
SIGWALD M. HAMMER
BY
Adams, Forward and McLean
ATTORNEYS

INVENTOR.
SIGWALD M. HAMMER

INVENTOR.
SIGWALD M. HAMMER
BY
Adams, Forward and McLean
ATTORNEYS

United States Patent Office 3,222,646
Patented Dec. 7, 1965

3,222,646
SUPERVISORY REMOTE CONTROL SYSTEM
Sigwald Morris Hammer, Independence, Kans., assignor to Sinclair Research, Inc., a corporation of Delaware
Filed Aug. 10, 1960, Ser. No. 48,729
11 Claims. (Cl. 340—163)

My invention relates to signaling systems and in particular provides a supervisory remote control system together with code generating and receiving circuits, code establishing and responsive circuits, alarm circuits indicating false operation and sequencing control circuits for regulating operation, permitting control functions to be properly transmitted and coordinating both control and controlled equipment. Although the control system of my invention has specific application to the control of a number of pump houses along a petroleum pipe line system, and will be described with reference to such hereinafter, it will be apparent that the control system and component circuits of my invention have broader application generally in the field of remote control.

In recent years modern pipe line systems have created an increasing demand for facilities which can provide means for remotely controlling the operation of pump stations associated with optimum performance of such systems. Numerous remote control systems have been developed, and, since these require the use of communication channels to connect control equipment and controlled equipment, it must be recognized that successful operation of the control systems is dependent upon the paths of communication and the facilities used in providing these channels. The increasing demand for more and more communication channels needed for transmitting and receiving intelligence in various forms has led to the development of complicated communication systems employing multiple carrier circuits over metallic paths and channelizing devices, typically associated with micro-wave systems. Since the nature and quantity of the various components necessary for this purpose, particularly on long circuits, play a large part in the success of any control system that is used, the remote control and telemetering systems should be designed to include safeguards which anticipate and allow for periodic circuit interruptions and malfunctions.

Such safeguards generally have led to the employment of separate control and supervisory communications channels, which in effect doubles the chance for control failure where control is dependent upon proper operation not only of the control channel but the supervisory channel as well. The need to permit transmission of more than one control function on a given control channel, moreover, has led to the employment of codes differentiating the various functions generally taking the form of pulse trains representing numerical quantities of long or short duration which are distinguished by responsive components at the controlled point or station. Complicated codes lessen the chance of false operation but on the other hand increase the number of times a code will not be accurately sent or received, particularly when step by step confirmation is required. Short and simple codes, by like reasoning, make for more reliable transmission but also increase the chance of false operation because of possible response to extraneously derived simple codes.

With these factors in mind, it is the primary object of my invention to provide a supervisory remote control system utilizing both control communication channels for transmission of control signals from the control station to each controlled station and supervisory communication channels for transmission of confirmation and alarm signals from each controlled station to the control station.

In accordance with this primary object, it is also an important object of my invention to provide a remote control system utilizing relays, stepping switches and similar equipment which have reached a high degree of electrical and mechanical perfection over a period of years. Incidental to this object, it is a further object of my invention to provide relatively simple code generating and receiving circuits utilizing such components.

These and other objects of my invention which will become apparent hereinafter are basically achieved utilizing control apparatus at the control station consisting of a control code generator, a confirmation code receiver, a control sequence timer and a control unit governing the operation of the control station and utilizing a controlled unit located at the controlled station governing the operation of the pump house or other controlled apparatus which is provided with a control code receiver responsive to control code signals properly sent by the control code generator and properly received at the controlled unit, a controlled sequence timer actuated by receipt of a control code to assure that the controlled unit and control unit act together when control functions are exercised to operate the equipment located at the controlled station and a confirmation code generator operable on the supervisory communications channel under the control of the controlled sequence timer to deliver a confirmation signal at the proper time indicative of the receipt of the particular control function code at the controlled unit.

It is preferred that communication on the control channel between the control and controlled units be in the form of numerically coded pulse trains, such as used in dial telephony selecting practice. In the system, as described later, open circuit pulsing is used such that the control channel, so far as the control unit and controlled unit are concerned, is normally open and momentarily closed for each pulse of a selecting code. It will be apparent, however, that closed circuit pulsing can also be utilized.

Also in the supervisory remote control system of my invention, the supervisory channel is used for two purposes. During the intervals when no control is being exercised the supervisory channel is used to indicate a condition at the controlled station, for example, in the case of a pipe line pump house it is utilized to indicate whether the pump unit is running. During the interval in which control is being exercised the supervisory channel is switched over for the purpose of conveying confirmation signals or where desired for telemetering information concerning the controlled station, such as on-demand meter totalizer counts and pressure readings.

In accordance with these general purposes, my invention provides a supervisory remote control system utilizing a plural digit code for transmission of control functions.

Thus, in one specific aspect my invention provides a control code generator for generating a plural digit code in the form of groups or trains of pulses which includes a bank of contacts and means for scanning such contacts sequentially to energize an output circuit each time a scanned contact is in a predetermined condition. Associated with the code generator are one or more code establishing devices, typically in the form of relays. Each code establishing device includes one or more connections to the bank of contacts to be scanned such that when the code establishing device is actuated the contacts of the code generator with which it is connected are conditioned to energize the output circuit of the code generator. The code generator and code establishing device are further provided with actuating circuits which, when operated, will actuate one or more of the code establishing devices simultaneously with the code generator to cause the latter sequentially to scan its bank of contacts, thereby generating in the output circuit of the code generator a train of pulses determined by the connections of the contacts with the code establishing device or devices actuated.

In another aspect my invention provides separate means located at the controlled unit responsive to each digit of the control code operable to establish a confirmation code signal in conjunction with the confirmation code generator, the latter being operable after receipt of the control code of the control communications channel to transmit the confirmation signal code over the supervisory communications channel to provide information at the control station indicative of the receipt of the control function code.

In this aspect of my invention I contemplate that during reception of the control code the first control code digit responsive means must operate in order to condition the second control code digit responsive means to be operated by the second digit of the code. Where more than two code digits are utilized the second control code digit responsive means must be operated in order to condition the third to operate and so forth.

I further contemplate that upon proper actuation of each of the control code digit responsive means related to a particular code the connection between the control code receiver and the control channel will thereupon be opened locking out the control code receiver from further operation until completion of the function initiated by the received control code and transmission of the confirmation signal.

In still another aspect of my invention I contemplate using a control code generator for establishing a plural digit code and a control code receiver having a bank of contacts and a device for sequentially scanning each such contact in the bank stepped in accordance with the number of pulses forming each digit of the code. A plurality of output circuits are provided for the code receiver, a separate such output circuit being connected to each contact in the bank of contacts associated with the code receiver corresponding to the position of the scanning device upon proper stepping from a predetermined initial position to the terminal pulse of each digit of the code. In this aspect, it is further contemplated that the bank contacts of the code receiver which do not correspond to a terminal pulse of a digit are connected to output circuits arranged to actuate alarm circuits and to disconnect the code receiver from its actuating circuit. I further contemplate therefore that means are provided deactivating each of the output circuits during reception of a train or a group of pulses in the actuating circuit of the code receiver and reactivating each of the output circuits upon the termination of each such train or group.

In still another aspect of my invention, I contemplate employing a confirmation signal generator for confirming receipt of a plural digit control code which is operable in association with a control code receiver having code responsive circuits actuated in sequence upon proper reception of each digit of the code in which the code responsive circuits upon operation actuate code establishing circuits associated with the confirmation code generator. Means are also provided to operate the confirmation code generator to transmit the code established by actuation of the code establishing circuits at a point in time following reception of the control code by the control code receiver, such that the signal transmitted by the confirmation code generator is directly responsive to the code received by the control code receiver and indicative of the proper functioning of the control code responsive circuits.

And yet another aspect of my invention I contemplate using a supervisory remote control system in which the control unit is associated with a control code generator for transmitting control function signals on a control channel to be received by a control code receiver located at the controlled unit and in which the controlled unit is provided with a confirmation code generator for transmitting confirmation signals on the supervisory channel to be received by a confirmation code receiver associated with the control unit. The control unit and controlled unit are each provided with sequence timers for controlling various components in and associated with their respective units. Thus the sequence timer associated with the control unit is actuated for a fixed period of time upon initiation of a control function resulting in transmission of a control signal by the control code generator. Means are provided to actuate the sequence timer located at the controlled unit for the same fixed period of time simultaneously with the receipt of the first impulse of the control signal by the control code receiver. The supervisory channel connection to the confirmation code generator is controlled by the sequence timer in the controlled unit, and the supervisory channel connection to the confirmation code receiver is controlled by the sequence timer licated in the control unit, such connections being actuated by the sequence timers substantially simultaneously for a period in the operational cycle accommodating proper elapse of time for transmission and reception of a control signal.

In this aspect I also contemplate that the sequence timers will be further provided with means for controlling the control code generator following a proper elapse of time for transmission and receipt of the confirmation code signal to permit a second control function signal to be transmitted and that the supervisory channel connection between the confirmation code generator and receiver will be thereafter again restored to permit transmission and receipt of a second confirmation code signal prior to completion of the operating cycles of the sequence timers which upon timing-out restore all equipment to stand-by condition.

In this aspect, I further contemplate that the sequence timer associated with the control unit will be provided with connections for holding a second code establishing circuit and for reactuating a first code establishing circuit as well as energizing the second code establishing circuit at the point in time of operation allotted for the second transmission of the control code. Similarly, I still further contemplate that the sequence timer associated with the controlled unit will be provided with connections for holding the code establishing circuits associated with the confirmation code generator, when the latter are established during transmission of the control code, until the periods in time of the controlled sequence allotted for transmission of the confirmation code signal and thereafter releasing such code establishing circuits.

For a more complete understanding of the practical application of my invention in the various aspects outlined above reference is made to the appended drawings in which;

FIGURE 2 is a schematic diagram of the control code generator shown in FIGURE 1;

FIGURE 12 is a diagram illustrating the physical relationship of the schematic diagrams shown in FIGURES 2, 3, 4, 5 and 6.

FIGURE 13 is a diagram illustrating the physical relationship of the schematic diagrams shown in FIGURES 7, 8, 9, 10 and 11.

*General description*

Figure 1:
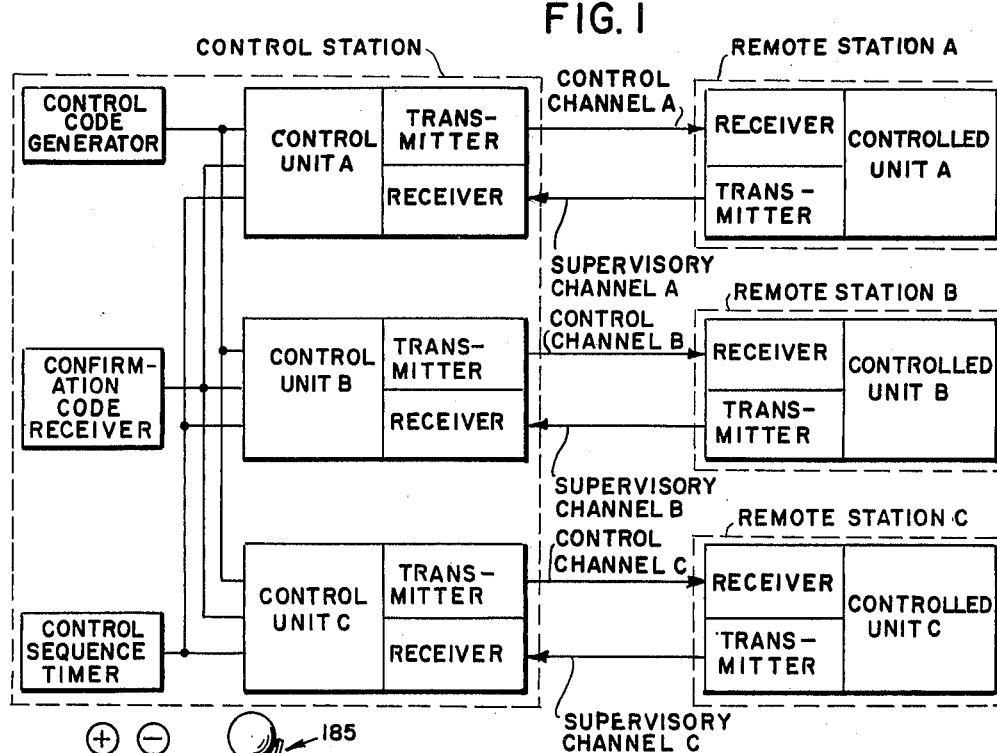
FIGURE 1 is a block diagram indicating the basic components of the supervisory remote control system of my invention and their interrelationship.

Referring more particularly to FIGURE 1, the supervisory control system of my invention contemplates a control station, suitably located at the dispatcher's office of a pipe line, and a number of remote stations, such as remote station A, remote station B and remote station C, each located at a separate pump house along the pipe line.

The control station includes several control units, one for each remote station, thus the control station includes a control unit A, a control unit B and a control unit C. Each of the control units A, B and C includes a transmitter and a receiver which are connected to communications channels leading to respectively a receiver and a transmitter at a controlled unit located in the remote station. Thus, control unit A is provided with a transmitter connected by a control channel A to a receiver at remote station A. Similarly, the receiver in control unit A is connected by a supervisory channel A to a transmitter at remote station A. Both the receiver and transmitter at remote station A are a part of a controlled unit A located in that station. Control unit B and control unit C are similarly provided with transmitters and receivers connected through control channels and supervisory channels to receivers and transmitters in their respective remote stations.

The control station also includes a control code generator, which is selectively operable by each control unit A, B and C, and similarly includes a confirmation code receiver and a control sequence timer each also selectively operable by each control unit A, B and C.

In operation, starting in a stand-by condition, the dispatcher desiring to contact a remote station, such as remote station A, initiates a check-code by means of control unit A which is generated by the control code generator. At the same time, the control sequence timer is started in operation for a set period of time to operate the various functions of control unit A in a predetermined sequence. The initiation of the control code generator also disables control units B and C from initiating any operation during the control cycle initiated by control unit A. The check-code generated by the control code generator is transmitted through the transmitter associated with control unit A on control channel A and received by the receiver at remote station A. The received code operates controlled unit A at remote station A which ascertains if the correct code has been transmitted and if so, through its transmitter sends a confirmation code received at the receiver at control unit A which is, by means of control sequence timer, delivered to the confirmation code receiver at the control station. The confirmation code receiver, upon receipt of the proper confirmation signal, delivers a signal to control unit A which permits further operation to initiate further codes for starting or stopping the pump at remote station A which are similarly delivered by the control code generator through the transmitter of control unit A to the receiver at controlled unit A by control channel A. The controlled unit A, ascertaining that a proper code has been sent, thereupon sends a confirmation signal through its transmitter to the receiver at control unit A indicating the function has been properly dispatched. At this point, the control sequence timer times out releasing control code generator and the confirmation code receiver as well as the control sequence timer for operation by any of the control units A, B and C.

*Control unit components*

Figure 3:
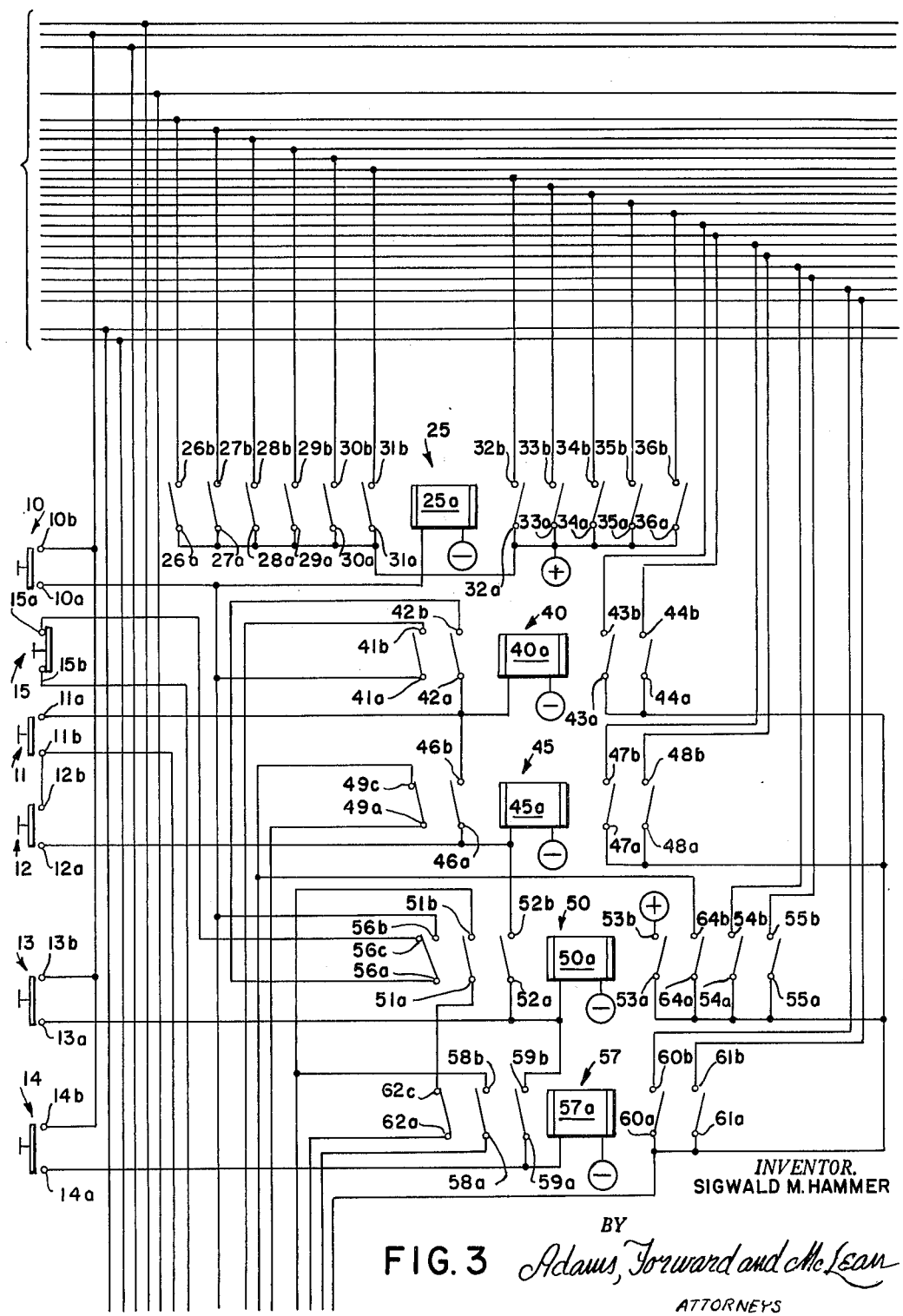
FIGURE 3 is a schematic diagram of a portion of a control unit A shown in FIGURE 1.
Figure 4:
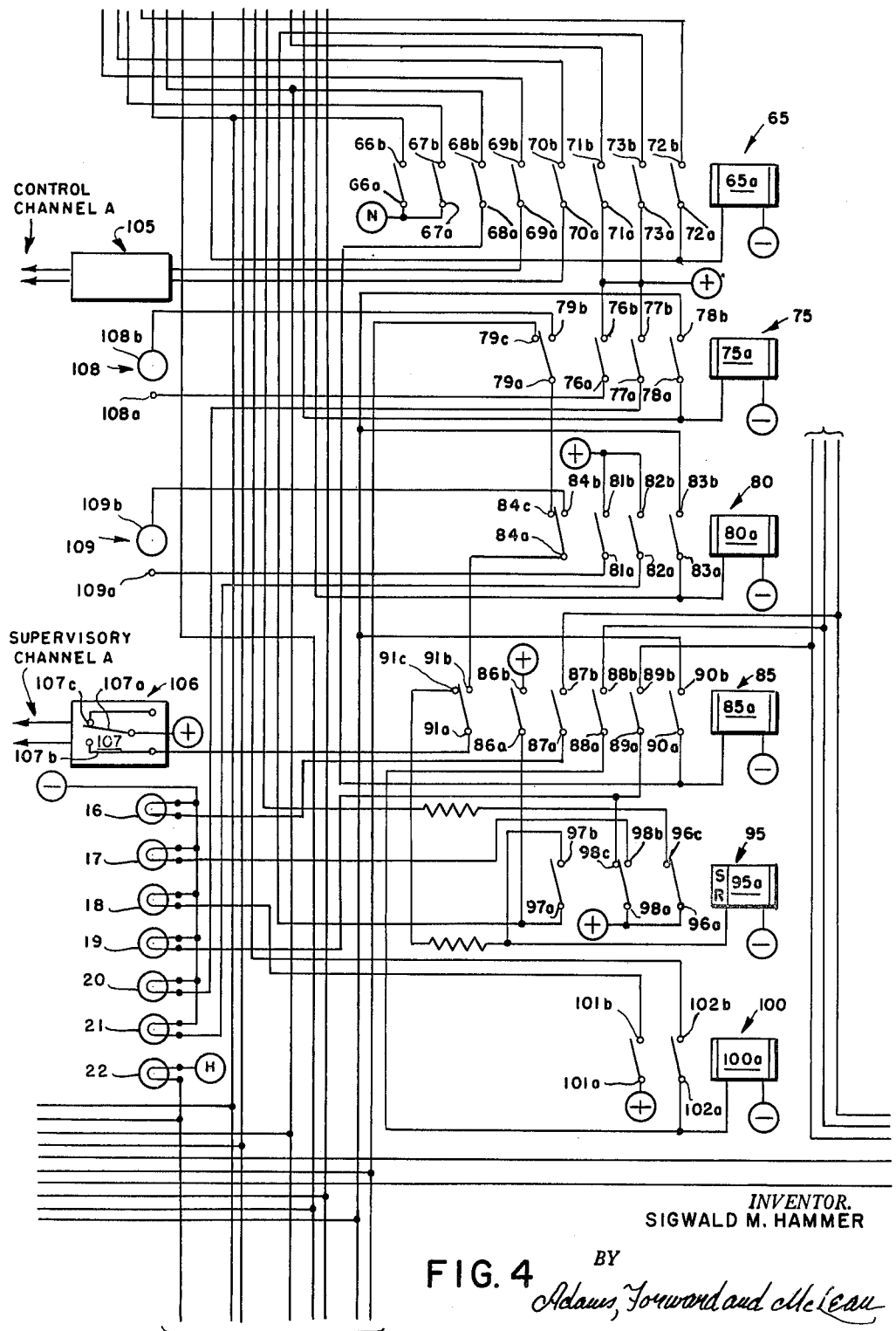
FIGURE 4 is a schematic diagram of the remainder of control unit A shown in FIGURE 3.

Referring more particularly to FIGURES 3 and 4, the construction of a typical control unit, such as control unit A, is shown. Basically, the control unit includes a number of push button controls for initiating the various functions (see FIGURE 3), signal lamps to indicate the condition of the controlled equipment (see FIGURE 4), a group of code establishing relays (see FIGURE 3), a group of control relays (see FIGURE 4), a group of condition responsive relays (see FIGURE 4), a tone transmitter (see FIGURE 4) and a tone receiver (see FIGURE 4).

A push button 10 is provided having a pair of normally open contacts, 10a, and 10b for initiating a check-code function. A push button 11 is provided having a pair of normally open contacts 11a and 11b for initiating a start function. A push button 12 is provided having a pair of normally open contacts 12a and 12b for initiating a stop function. Similarly, a push button 13 having a pair of normally open contacts 13a and 13b and a push button 14 having a pair of normally open contacts 14a and 14b are provided for initiating additional functions. In the illustrated case, push button 13 is utilized to provide suction pressure readings of the controlled pump, and push button 14 is utilized to provide discharge pressure readings of the controlled pump. In addition, a push button 15 having a pair of normally closed contacts 15a and 15b is provided for cancelling previously initiated start and stop functions.

An indicating lamp 16 is provided for confirming proper receipt of the check-code. An indicating lamp 17 is provided for indicating that the pump has started or is running. An indicating lamp 18 is provided for indicating that the start code has properly been received and the pump conditioned to start. An indicating lamp 19 is provided for indicating the pump has stopped or is not running. An indicating lamp 20 is provided for indicating that suction pressure is being read. An indicating lamp 21 is provided for indicating that discharge pressure is being read. And also, an indicating lamp 22 is provided for indicating the control unit to be in stand-by condition.

The code establishing relays in the control unit include a check-code establishing relay 25 having an actuating coil 25a, and 11 pairs of normally open contacts, 26a and 26b, and 27b, 28a and 28b, 29a and 29b, 30a and 30b, 31a and 31b, 32a and 32b, 33a and 33b, 34a and 34b, 35a and 35b and 36a and 36b. A start code establishing relay 40 having an actuating coil 40a is provided and has four pairs of normally open contacts 41a and 41b, 42a and 42b, 43a and 43b and 44a and 44b. A relay 45 having an actuating coil 45a is provided to establish the stop code. Relay 45 is provided with three pairs of normally open contacts 46a and 46b, 47a and 47b and 48a and 48b and a normally closed pair of contacts 49a and 49c. The code to initiate suction pressure readings is established by a relay 50 having an actuating coil 50a and which is provided with six pairs of normally open contacts 51a and 51b, 52a and 52b, 53a and 53b, 54a and 54b, 55a and 55b and 64a and 64b and a group of three associated contacts 56a, 56b and 56c, of which contacts 56a and 56b are normally open and contacts 56a and 56c are normally closed. Similarly the code to initiate discharge pressure readings established by a relay 57 having an actuating coil 57a and provided with four pairs of normally open contacts 58a and 58b, 59a and 26b, 27a and 27b, 28a and 28b, 29a and 29b, 30a and 30b, mally closed contacts 62a and 62c.

The control relays include a master control relay 65 having an actuating coil 65a and which is provided with eight pairs of normally open contacts 66a and 66b, 67a and 67b, 68a and 68b, 69a and 69b, 70a and 70b, 71a and 71b, 72a and 72b and 73a and 73b. A relay 75 is provided for controlling suction pressure and includes an actuating coil 75a, three pairs of normally open contacts 76a and 76b, 77a and 77b and 78a and 78b and a group of three contacts 79a, 79b and 79c of which contacts 79a and 79b are normally open and contacts 79a and 79c are normally closed. A relay 80 is provided to control discharge pressure readings and is provided with an actuating coil 80a, three pairs of normally open contacts 81a and 81b, 82a and 82b and 83a and 83b and a group of three contacts 84a, 84b and 84c of which contacts 84a and 84b are ordinarily open and contacts 84a and 84c are normally closed. Control of the supervisory channel is provided by a relay 85 having an actuating coil 85a and provided with five pairs of normally open contacts 86a and 86b, 87a and 87b, 88a and 88b, 89a and 89b and 90a and 90b and three contacts 91a, 91b and 91c of which contacts 91a and 91b are normally open and contacts 91a and 91c are normally closed.

The indicating relays include a station condition indicating relay 95 having an actuating coil 95a, one pair of normally closed contacts 96a and 96c, one pair of normally open contacts 97a and 97b, and a group of three associated contacts 98a, 98b and 98c of which contacts 98a and 98b are normally open and contacts 98a and 98c are normally closed. Relay 95, as indicated on the drawings is a slow release relay. The other indicating relay is the relay 100 for indicating a permissive start condition. Relay 100 includes an actuating coil 100a and two pairs of normally open contacts 101a and 101b and 102a and 102b.

In addition to the various relays, control buttons and indicating lamps associated with the control unit, for example, control unit A shown in FIGURES 3 and 4, there are additionally a tone transmitter 105 and a tone receiver 106 associated with the control unit. Tone transmitter 105 includes a tone generator for modulating a micro-wave transmitter and is provided with an input circuit which when closed causes a shift in the tone frequency. Similarly tone receiver 106 is connected to the output of a micro-wave receiver and includes a single pole double-throw switch 107 having a pole 107a, a normally open contact 107b, and a normally closed contact 107c. Switch 107 is operated upon a shift in the tone frequency modulating the micro-wave received by the micro-wave receiver to actuate pole 107a to open its connection with contact 107c and close its connection with contact 107b. The control unit also includes a jack 108 for reading suction pressure which has a ground terminal 108a and an open terminal 108b. A second jack 109 is provided for reading discharge pressure and includes a grounded terminal 109a and an open terminal 109b.

*Control code generator components*

The control code generator unit, which is shown in FIGURE 2, basically includes a rotary switch 115 which is a stepping switch modified by the substitution of a rotary drive synchronous motor 116 for the motor magnet. In the illustrated case, switch 115 has a wiper arm 115a for sequentially contacting thirty contacts 115b of a bank of forty contacts. Wiper arm 115a normally rests on a first contact designated 115c to which it returns after each sweep of bank contacts 115b. Motor 116, which is operable at a rate of fifteen revolutions per minute, is connected to wiper 115a to cause one revolution of wiper 115a through its bank of contacts 115b in a four second period. Switch 115 further includes two groups of "off-normal" contacts 117a, 117b and 117c and 118a and 118b which are operated by movement of wiper 115a off its home position at contact 115c and are restored to original condition when wiper 115a returns to home contact 115c. At the home position of wiper 115a, contacts 117a and 117c are normally closed while contacts 117a and 117b, and contacts 118a and 118b are normally open. Upon actuation contacts 117a and 117b close, contacts 117a and 117c open, and contacts 118a and 118b close together. Control code generator also includes a brake circuit for motor 116 which includes a rectifier 119 and a resistor 120. A pulse generating relay 125 is provided having an actuating coil 125a and a pair of normally open contacts 126a and 126b.

*Control sequence timer components*

The control sequence timer (see FIGURE 5) includes six cams 140, 141, 142, 143, 144 and 145 mounted on a common shaft 146 driven by a motor 147. Six switches 150, 151, 152, 153, 154 and 155 are provided which are operated by cams 140, 141, 142, 143, 144 and 145, respectively. Thus, switches 150, 151, 152, 153, 154 and 155 are provided with armatures 150a, 151a, 152a, 153a, 154a and 155a, respectively, which are positioned to ride in contact with the periphery of the cams associated with the respective switches.

The engaging surface of cam 140 with armature 150a which is generally circular is notched through a 12° arc. When armature 150a rides in the notch, it makes connection with a contact 150b and when it rides over the remaining portion of cam 140 armature 150a makes connection with a contact 150c. Cam switches 151, 152, 153, 154 and 155 are similarly actuated by circular surfaced cams 141, 142, 143, 144 and 145, respectively, which engage armatures 151a, 152a, 153a, 154a and 155a. Cam 141 is provided with a notch of 156° of its surface and armature 151a when riding in the notch makes contact with a contact 151b and when riding on the unnotched portion of cam 141 makes connection with a contact 151c. Cam 142 is provided with two notches, one notch including 60° of its surface and the other 72° of its surface. The associated armature 152a when riding in either of the notches in cam 142 makes connection with a contact 152b which is opened when armature 151a rides on the unnotched surface of cam 142. Cam 143 is similarly provided with two notches, each of 24° duration. The associated armature 153a when riding in either notch makes connection with a contact 153b and when riding on the unnotched portion of cam 143 makes connection with a contact 153c. Cam 144 is provided with a single notch of 36°. When its associated armature 154a rides in the notch it makes connection with a contact 154b which otherwise remains open. Cam 145 is similarly provided with a single notch of 12° and is arranged such that armature 155a makes connection with a contact 155c at all times except when the armature rides in the notch at which point the connection is broken.

The six cams 140–145, inclusive, are mounted on common shaft 146 in fixed angular position relative to each other. Motor 147, which in the illustrated case is a synchronous motor having a speed of 2 revolutions per minute, provides a 30 second operating cycle for the cams. The cams are further arranged such that in normal standby condition armature 150a rides in the notch on its associated cam 140 while the remaining armatures 151a, 152a 153a, 154a and 155a ride on the unnotched portion of their associated cams. The cams are further arranged such that at the end of the first second of movement from normal stand-by position, armature 150a rides out of its associated notch and at the same time, armature 151a falls into its associated notch where it remains until the end of the fourteenth second. Armature 152a is arranged to fall in its associated 60° notch at the fourth second of operation in which it stays until the ninth second and falls into the second notch in cam 142 at the twenty-third second in which it remains until the twenty-ninth second. Armature 153a runs through the fifteenth second on the unnotched portion of its associated cam 143 at which point it drops for two seconds, that is, for the sixteenth and seventeenth seconds and then rises again onto the unnotched portion of cam 143 on which it continues until the twenty-eighth second at which time armature 153a again falls for two seconds, that is, through the twenty-ninth second. Armature 154a rides on the unnotched portion of its associated cam 144 from stand-by until the thirteenth second falling into the notch through the fourteenth, fifteenth and sixteenth seconds and then riding out of the notch through the remainder of the cycles of operation. Lastly, armature 155a rides on the unnotched portion of its associated cam 145 through the twenty-seventh second falling into the cam at the twenty-eighth second and remaining there for one second rising out at the twenty-ninth second.

*Confirmation code receiver components*

Figure 6:
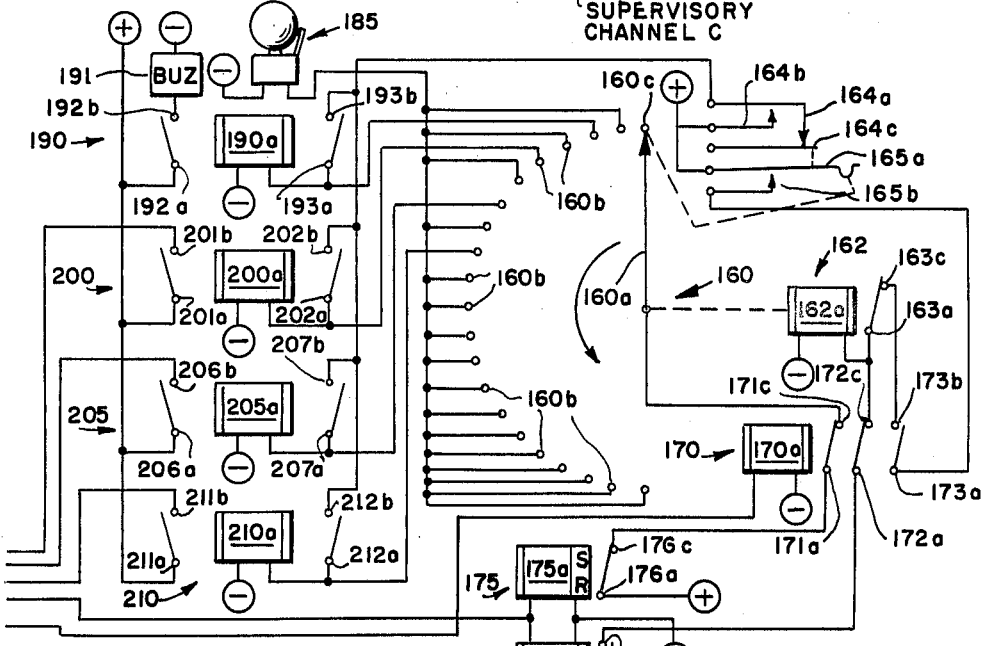
FIGURE 6 is a schematic diagram of the control code receiver shown in FIGURE 1.

Referring to FIGURE 6, the confirmation code receiver located at the control station basically includes a stepping switch 160 having a wiper arm 160a operated through the agency of a motor magnet 162 stepwise and in sequence in contact with each of a bank of 21 contacts 160b and normally at rest on a contact 160c. Motor magnet 162, which includes an actuating coil 162a, is further provided with a pair of normally closed contacts 163a and 163c.

In addition stepping switch 160 also has associated with it two groups of "off-normal" contacts 164a, 164b and 164c, and 165a and 165b which are operated upon wiper 160a stepping off its home contact 160c and which are restored upon completion of the cycle of wiper 160a back to its home position at contact 160c. Of the wiper operated "off-normal" contacts, contacts 164a and 164c at the home position of wiper 160a are normally closed while the remaining contacts are open. Upon actuation of wiper 160a off home on contact 160c, the connection between contacts 164a and 164c is broken. At the same time contacts 164a and 164b close as also do contacts 165a and 165b.

The confirmation code receiver further includes a homing relay 170 having an actuating coil 170a, two pairs of normally closed contacts 171a and 171c and 172a and 172c and one pair of normally open contacts 173a and 173b. Also a slow release relay 175 having an actuating coil 175a and a pair of normally closed contacts 176a and 176c is employed to control the energization of wiper 160a. A relay 180 having an actuating coil 180a and a pair of normally open contacts 181a and 181b is provided for control of motor magnet 162.

The confirmation code receiver is further provided with five code and malfunction responsive devices. These include an odd pulse alarm bell 185, and an improper response alarm, including a relay 190, and a buzzer 191. Relay 190 is provided with an actuating coil 190a and two pairs of normally open contacts 192a and 192b and 193a and 193b. A relay 200 having an actuating coil 200a is provided for response to a check code confirmation signal. Relay 200 is provided with two pairs of normally open contacts 201a and 201b and 202a and 202b. A relay 205 having an actuating coil 205a is provided for response to a start code confirmation signal. Relay 205 is also provided with two pairs of normally open contacts 206a and 206b and 207a and 207b. A relay 210 having an actuating coil 210a is provided for response to a stop code confirmation signal and includes two pairs of normally open contacts 211a and 211b and 212a and 212b.

*Control station code generating circuits*

The code establishing circuits involve connections between the various push buttons 10, 11, 12, 13 and 14 shown in FIGURE 3 and relays 25, 40, 45, 50 and 57 with control code generator switch 115 shown in FIGURE 2. Referring more specifically to FIGURES 2 and 3, check code relay 25 has each of its various contacts 26b, 27b, 28b, 29b, 30b, 31b, 32b, 33b, 34b, 35b and 36b connected to the first through the fourth, the tenth through the thirteenth and the nineteenth through the twenty-first bank contacts 115b after contact 115c. Contacts 26a–36a, inclusive, of check code relay 25 are connected to ground on which a positive voltage is maintained.

Wiper 115a of switch 115 is in turn connected through the actuating coil 125a of relay 125 to a negative voltage. Thus, when check code relay 25 is actuated, closing all of its normally open associated contact pairs, the sweep of wiper 115a through one cycle from contact 115c back to that contact will cause relay 125 to be actuated four times with a space, then four times with a space and then three times. The check code of 4–4–3 is thus established at a pulsing rate of ten pulses per second.

The start code of 4–4–5 is established by actuation of start code relay 40 in addition to that of check code relay 25 through connection of contacts 43b and 44b of start code relay 40 to the twenty-second and twenty-third bank contacts 115b of switch 115. Similarly, the stop code of 4–4–7 is established by actuation of relay 45 in conjunction with relays 25 and 40 through the connection of contacts 47b and 48b of relay 45 with the twenty-fourth and twenty-fifth bank contacts 115b of switch 115. The suction pressure code of 4–4–9 is established by means of relay 50 in addition to relays 25, 40 and 45 through the connection of contacts 54b and 55b of relay 50 with the twenty-sixth and twenty-seventh bank contacts 115b of switch 115. The discharge pressure code of 4–4–11 is established by means of relay 57 in conjunction with relays 25, 40, 45 and 50 through the connection of contacts 60b and 61b of relay 57 with the twenty-eighth and twenty-ninth bank contacts 115b of switch 115. Contacts 43a and 44a of relay 40, contacts 47a and 48a of relay 45, contacts 54a and 55a of relay 50, and contacts 60a and 61a of relay 57 are commonly connected to ground serially through cam switches 154 and 153 of control sequence timer (see FIGURE 5) during the fourteenth and fifteenth seconds of operation of motor 147 since they are connected to contact 154b and since armature 154a is connected to ground by a connection to contact 153c whose associated armature 153a is tied to ground. A ground is also provided for the same series of contacts through their common connection with contact 53a of suction pressure code relay 50, the associated contact 53b of which is connected to ground. It will thus be evident that when relays 25 and 40 are both actuated the code established is 4–4–5. When check code relay 25, start code relay 40 and stop code relay 45 are actuated the code becomes 4–4–7. When to these are added relay 50 the code becomes 4–4–9, and finally when relay 57 is added, the code becomes 4–4–11.

*Control station actuating circuits*

Actuation of relays 25, 40, 45, 50 and 57 to establish the various codes is brought about through the agency of push button switches 10, 11, 12, 13 and 14 in conjunction with the control circuits and relays. It will thus be noted that contact 10a of check push button 10 is connected to actuating coil 25a of relay 25, the other side of which is connected to negative voltage. Contact 10a is also connected through the actuating coil 65a of master relay 65 to negative voltage. Contact 10b of push button switch 10 along with contacts 13b and 14b of push button switches 13 and 14, respectively, is connected to contact 117c of the off normal switch associated with switch 115 and hence through contact 117a to ground.

Accordingly, when push button 10 is depressed to close connection between contacts 10a and 10b relay coil 25a is energized to close all the associated pairs of contacts of relay 25 thereby placing ground on the associated bank contacts 115b of switch 115. A locking circuit is established through the connection of contact 72a of master relay 65 to the ground side of coil 65a of master relay 65 and the connection of its associated contact 72b with contact 117b of the off normal switch associated with switch 115. Thus, upon depression of the check push button 10 and subsequent movement of wiper 115a through the sequence of its associated bank contacts 115b, the actuation of off normal switch contacts 117a and 117b provides a locking circuit for relays 25 and 65 until the cycle of the control code generator is completed. In order that the control code generator can commence its cycle, it will be noted that motor 116 is connected from a hot A.C. supply to neutral through contacts 67b and 67a associated with relay 65. Thus, upon actuation of relay 65, the circuit for motor 116 is completed. This circuit is locked by a connection of neutral A.C. shunting the connection of contacts 67a and 67b through contacts 118b and 118a of the off normal switch associated with switch 115.

Start and stop push buttons 11 and 12 have their terminals 11b and 12b commonly connected to contact 151b of the control sequence timer. As before described, at the end of the first second of operation of control sequence timer, armature 151a, which is connected to ground, makes connection with contact 151b, thus providing a ground at terminals 11b and 12b of push buttons 11 and 12. The associated contact 11a of start push button 11 is connected to negative voltage through the actuating coil 40a of start code establishing relay 40. Similarly, the associated contact 12a of stop push button 12 is connected to negative voltage through the actuating coil 45a of stop code establishing relay 45. Thus, upon actuation of either start push button 11 or stop push button 12, the associated relay 40 or 45 is actuated, provided the contact with the push buttons is made during the first to the fourteenth second of operation.

Moreover, it will be noted that contact 151c of cam operated switch 151 is connected through contacts 41b and 41a of relay 40 to negative voltage through actuating coil 25a of check code establishing relay 25. The connection of armature 151a to ground thus provides an actuating circuit for check code establishing relay 25 after the fourteenth second of operation when armature 151a closes with contact 151c. Similarly, upon actuation of stop code establishing relay 45 through depression of button 12, a connection from contact 12a through contacts 46a and 46b of relay 45 to negative voltage through actuating coil 40a of relay 40 assures that relay 40 also will be actuated upon actuation of relay 45 and hence, also, check code establishing relay 25, at the fourteenth second.

Terminal 13a of suction pressure push button 13 is connected through actuating coil 50a of suction pressure code establishing relay 50 to negative voltage. Since its associated contact 13b is commonly ganged with contact 10b to ground, depression of button 13 will cause actuation of relay 50. But, terminal 13a is also connected through contacts 52a and 52b of relay 50 to actuating coil 45a of relay 45 and thence to negative voltage. Thus, upon actuating button 13, relays 40, 45 are operated as well as relay 50. Similarly, terminal 14a of push button 14 is connected to negative voltage through actuating coil 57a of relay 57 and is also connected through contacts 59a and 59b through actuating coil 50a of relay 50 to negative voltage. Hence, upon depression of push button 14, relays 40, 45, 50 and 57 all operate. A third actuating circuit for relay 25 is provided immediately upon actuation of relay 50, and hence upon actuation of relay 57, through a connection of contact 56b to the ground side of winding 25a and a connection of contact 56a to contact 42b of relay 40 whose associated contact 42a is connected to the ground side of coil 40a.

Rotary switch 115 during control periods is provided with a brake circuit through connection of motor 116 between a hot A.C. supply line and a series connection of rectifier 119, resistor 120, contact 150c and armature 150a which is connected to neutral A.C. The connection provided, however, on the neutral side of motor 116 through contacts 118a and 118b of the off normal switch associated with switch 115 shunts the brake circuit during operation of motor 116. A second connection shunting the rectifier-resistor brake circuit for motor 116 is provided by connection of motor 116 to neutral A.C. through contacts 67b and 67a of master relay 65. Thus, upon actuation of any of push buttons 10, 11, 12, 13 and 14, the consequent actuation of relay 65 provides a shunt across the brake circuit before contacts 118a and 118b close and putting motor 116 in operation. Switch 115 stepping off the normal position of wiper 115a at contact 115c causes actuation of the off normal switch contacts and consequent closure of contacts 118a and 118b thereby locking the energizing circuit for motor 116 until the cycle of operation of wiper 115a has been completed and the connection between contacts 118a and 118b is broken.

The actuation of the off normal contacts associated with switch 115 moreover breaks the connection between normally closed contacts 117a and 117c thereby disabling the check switch button 10 and the suction pressure and discharge pressure push buttons 13 and 14; not only for the control unit shown in FIGURES 3 and 4, but also for those other units which may be located at the control station and which are commonly connected to the off normal contact 117c.

At the same time, contacts 117a and 117b close, thereby making a ground connection at contact 117b with contact 72b of master relay 65, the associated contact 72a of which is connected through actuating coil 65a of relay 65 to negative voltage. Accordingly, relay 65 is locked for the cycle of operation of switch 115. Since relay 65 actuating coil 65a is connected in parallel with actuating coil 25a, check code establishing relay 25 is also locked for the cycle of operation of motor 116. If, however, code establishing relays 40 or 45 have been also actuated, it will be noted that a ladder of holding circuits for relays 40 and 45, which includes the series connection of contacts 46a, 46b, 42a and 42b is provided for holding the actuating coils of relays 40 and 45, as these may be energized, by a connection from the ground side of coil 40a to contact 42a of relay 40 and by connection of contact 42b through closed contacts 56a and 56c of relay 50, closed contacts 15a and 15b of push button 15 to contact 153c of cam operated switch 153 whose armature 153a is connected to ground.

During the first fifteen seconds of the operating cycle of the control sequence timer, it will be noted that contact 153c makes a connection through its armature 153a to ground. During the fifteenth and sixteenth seconds the circuit is broken by armature 153a breaking connection with contact 153c as armature 153a rides across the first notch in cam 143. The same ladder holding circuit is re-established at the end of the seventeenth second through the reconnection of contact 153c and armature 153a until the end of the twenty-seventh second when the circuit is again broken, through the twenty-ninth second and re-established at stand-by position.

A second ground is provided for holding relays 40 and 45 in the event relay 50 or relay 57 is actuated which also holds the latter relays through an additional ladder circuit from the ground side of relay 57 through contacts 59a, 59b, 52a and 52b to the ground side of coil 45a at contact 46a. Since relay 50 will be actuated the closure of normally open contact pair 56a and 56b of relay 50 connects the entire ladder holding relays 40, 45, 50 and 57 to the holding circuit for relay 25 by connection of contact 56b to the ground side of coil 25a.

Master relay 65 is provided with an A.C. neutral connection at its contact 66a such that the associated contact 66b when relay 65 is actuated, puts A.C. neutral on control sequence timer motor 147 which is connected on its opposite side to a hot A.C. line. Accordingly, when master control relay 65 is actuated, the control sequence timer is also initiated in operation. Cam operated switch 150, through the connection of its armature 150a to neutral A.C. and the connection of contact 150c in parallel with contacts 66a and 66b, at the end of the first second of operation places neutral A.C. on control sequence timer motor 147 to hold the motor in operation for one cycle of operation, that is, a period of thirty seconds, and also set up the brake circuit for motor 116 for a like period.

Contacts 69a and 70a of master relay 65 are connected to the input of tone transmitter 105. Thus, upon actuation of relay 65, by reason of the connection of contacts 69b and 70b to contacts 126b and 126a respectively, tone transmitter 105 is placed under the control of relay 125. Hence upon actuation of any of push buttons 10, 11, 12, 13 or 14, initiating a cycle of operation of the control code generator and simultaneously closing master relay 65, the pulses of relay 125 determined by the code establishing relays thereby modulate tone transmitter 105 in accordance with the code established.

Cam operated switch 151 through connection of its armature 151a to positive ground voltage, at the end of the first second and through the fourteenth second places ground on push button contacts 11b and 12b through its closure with contact 151b and connection of contact 151b with contacts 11b and 12b of push buttons 11 and 12. Thus, after the control unit has been placed in operation by actuation of check push button 10, the control sequence timer at the end of the first second places start and stop push buttons 11 and 12 in a position to actuate their associated code establishing relays 40 and 45 for a period of thirteen seconds. Contact 151b is also connected to contact 68b of master relay 65. Hence, upon the actuation of master relay 65 the closure of contact 68a and 68b, through the connection of contact 68a through the actuating coil 85a of relay 85 to negative voltage, causes relay 85 to be actuated at the end of the first second of the control sequence period.

Contacts 71a and 71b of relay 65 are arranged to provide a circuit for actuating either relay 75 or relay 80, depending uopn the actuation of code establishing relays 50 and 57. More specifically, contact 71a is connected to ground while contact 71b is connected both to contact 51b of relay 50 and contact 58b of relay 57. Contact 51a of relay 50 is connected through normally closed contacts 62a and 62c of relay 57 and through the actuating coil 75a of suction pressure control relay 75 to negative voltage. Thus, after a code establishing operation involving depression of suction pressure push button 13, such that relay 50 has been actuated but relay 57 has not been actuated, the concomitant closure of relay contacts 71a and 71b will cause actuation of relay 75. Contact 58a of relay 57 is connected to negative voltage through the actuating coil 80a of relay 80. Consequently, after a code establishing operation in which the discharge pressure push button 14 has been depressed to actuate the relay 57, the concomitant closure of relay 65 contacts 71a and 71b will cause relay 80 to operate. In this event, however, the opening of contacts 62a and 62c of discharge pressure code establishing relay 57 will break the circuit for actuating suction pressure control relay 75 such that although relay 50 will operate upon actuation of relay 57, suction pressure control relay 75 will not operate.

Relays 75, 80 and 85 are provided with a common locking circuit effective to hold any of them once actuated until the twenty-eighth second of the control sequence timer operation. This circuit involves the common connection of contacts 78b, 83b and 90b to contact 155c of cam operated switch 155, the cooperating armature 155a of which is tied to positive ground, while the cooperating contacts associated with the relays, that is, contact 78a, 83a and 90a are each respectively connected through actuating coils 75a, 80a and 85a to negative voltage.

Control relay 85 has its contact 91a tied to output contact 107b of tone receiver 106, such that upon tone receiver 106 receiving a modulating signal, the operation of its pole 107a connected to positive ground will close a circuit through contact 107b, contact 91a and contact 91c to actuate station condition indicating relay 95. Thus, contact 91c is connected through actuating coil 95a of relay 95 to negative voltage. When relay 85 is actuated, however, connection of contacts 91a and 91c is broken; contact 91a is connected to contact 91b which is in turn connected through the normally closed pair of contacts 84a and 84c of relay 80 and the normally closed contacts 79a and 79c of relay 75 to armature 152a of cam operated switch 152 in the control sequence timer. The associated contact 152b, which makes connection with armature 152a during the fourth through the ninth seconds and during the twenty-third through the twenty-ninth seconds of the control sequence, is connected both through actuating coil 175a of wiper control relay 175 to negative voltage and through actuating coil 180a of motor magnet control relay 180 to negative voltage.

Thus, when relay 85 is actuated, modulations received by tone receiver 106 closing of contacts 107a and 107b will energize coils 175a and 180a, but only during the two above noted five and six second intervals of the control sequence. In the event that relay 75 has been actuated, however, the opening of the connection between contacts 79a and 79c and the closure of contact 79a with contact 79b connects tone receiver 106 to terminal 108b of jack 108. Simultaneously, the closure of contacts 76a and 76b puts positive ground of contact 76b on ground terminal 108a of jack 108 which is connected to contact 76a. In the event that relay 80 is actuated, the circuit connecting tone receiver contact 107b with relay coils 175a and 180a is broken by the opening of contacts 84a and 84c associated with relay 80. In this event, the closure of relay contacts 84a and 84b connects terminal 107b to open terminal 109b of discharge pressure read out jack 109. Simultaneously the closure of relay contacts 81a and 81b connects positive ground voltage at contact 81b to ground terminal 109a of jack 109 which is connected to contact 81a.

*Control station code receiving circuits*

The confirmation code receiver is under the control of cam switch 152. As pointed out before, the connection of supervisory channel A through tone receiver contact 107b to relays 175 and 180 is through switch 152 contacts 152a and 152b which are operative to make the connection at the fourth through the ninth seconds of the control sequence timer cycle and the twenty-third through the twenty-ninth seconds of the control sequence cycle. As will be apparent, motor magnet 162 is provided with energizing current upon the closure of contacts 181a and 181b since contact 181a is connected to positive ground while contact 181b is connected through normally closed contacts 172a and 172c and the actuating coil 162a of motor magnet 162 to negative voltage. Since each change in the tone received by tone receiver 106 causes a closure of contact 107a and contact 107b, thereby completing a circuit for relay coil 180a during the operative portions of the cycle permitted by cam switch 152, such closure will result in the closure of contacts 181a and 181b energizing motor magnet coil 162a. Upon each such energizing movement, wiper 160a will make a step-wise movement from one contact to the next of its bank of contacts 160b.

The first such pulse carrying wiper 160a off home position at contact 160c closes off normal contact 164a and 164b and off normal contacts 165a and 165b associated with stepping switch 160. Both contacts 164b and 165a are connected to positive ground. Since contact 164a is connected to contact 193b of improper response alarm relay 190, contact 202b of check code confirmation relay 200 and to contacts 207b and 212b of start code confirmation relay 205 and stop confirmation relay 210, respectively, the movement from home position of stepping switch 160 sets up potential circuits for locking up relays 190, 200, 205 and 210 as the associated contacts 193a, 202a, 207a and 212a are connected respectively through actuating coils 190a, 200a, 205a and 210a of relays 190, 200, 205 and 210.

The first, third, fifth, seventh and ninth through the remainder of bank contacts 160b in sequence off home position at contact 160c of stepping switch 160 are all connected in common through odd pulse alarm bell 185 to negative voltage. Wiper 160a is connected through normally closed contacts 171c and 171a of relay 170 and normally closed contacts 176c and 176a of relay 175 to positive ground, accordingly, establishing an energizing circuit for bell 185 in the event that wiper 160a stops on any of the contacts 160b commonly connected to bell 185 and relays 170 and 175 remain unactuated. The second contact 160b off home is connected through the actuating coil 190a of improper response alarm 190 to negative voltage, while the fourth contact 160b off home is connected through actuating coil 200a of check code confirmation relay 200 to negative voltage. Similarly, the sixth contact 160b off home is connected through actuating coil 205a of start code confirmation code relay 205 to negative voltage, and the eighth contact 160b off home is connected through actuating coil 210a of stop code confirmation relay 210 to negative voltage. Thus, in the event that wiper arm 160a stops on any of the second, fourth, sixth and eighth contacts 160b and relays 170, 175 and 180 remain unactuated, the associated relays 190, 200, 205 or 210 will be actuated.

When pulses are received over supervisory channel A causing actuation of tone receiver 106 during the moments of control of cam operated switch 152, an odd number of pulses will obviously cause actuation of odd pulse alarm 185 indicating the reception of an odd number of pulses. However, it will be noted that when a series of pulses are received, the actuation of relay 175 breaks the connection of wiper 160a to positive ground. Since relay 175 is a slow release relay, a series of pulses will prevent wiper 160a making any circuit until the series of pulses has stopped. Thus, a series of four pulses will result in actuation of check code confirmation relay 200; a series of six pulses will result in actuation of start code confirmation code relay 205; and a series of eight pulses will result in actuation of stop code confirmation relay 210.

After the periods of control of stepping switch 160 by supervisory channel A, that is during the fourth to the ninth second period of the timer sequence cycle and the twenty-third through the twenty-ninth second of the control timer sequence cycle, stepping switch 160 is homed under the control of control sequence timer cam switch 153, which during the sixteenth and seventeenth seconds of the cycle and during the twenty-eight and twenty-ninth seconds of the cycle causes its armature 153a to close with its contact 153b. Since armature 153a is connected to positive ground and contact 153b is connected to negative voltage through actuating coil 170a of homing relay 170, homing relay 170 is actuated twice in each cycle, once during the sixteenth and seventeenth seconds of the control timer sequence cycle and once during the tweny-eighth and twenty-ninth seconds of the cycle. Homing relay 170 has its contacts 171a and 171c as before noted, connected in the energizing circuit leading to wiper 160a. Consequently, the operation of homing relay 170 breaks the energizing circuit to wiper 160a preventing any improper response on the part of stepping switch 160 and its associated circuits. At the same time, since the energizing circuit for motor magnet 162 under the control of motor magnet control relay 180 is connected through normally closed contacts 172a and 172c of homing relay 170, no possible energization of motor magnet 162 during the homing period of the cycle by the signals in supervisory channel A is possible. The homing circuit is established by means of off normal contacts 165a and 165b, homing relay contacts 173a and 173b and motor magnet contacts 163c and 163a in a circuit which connects these in series with the actuating coil 162a of motor magnet 162 to negative voltage. Thus, contacts 163a and 163c operate as interrupter contacts upon each actuation of motor magnet 162 under the ground provided by contact 165a thereby stepping wiper 160a back to home position at contact 160c at which point off normal contacts 165a and 165b break disabling the homing circuit.

*Control station indicating circuits*

Improper response alarm relay 190, which is actuated upon receipt of two pulses, upon actuation closes a circuit ringing buzzer 191 by connection of contact 192a with positive ground and connection of contact 192b through buzzer 191 to negative voltage.

The other indicating circuits located in control station A include a circuit connecting stand-by indicating lamp 22 to hot A.C. supply line through cam operated switch 150. In this circuit armature 150a, which upon operation of the control sequence timer locks up timer motor 147, in stand-by position rests in the notch in cam 140 connecting neutral through contact 150b and through stand-by 22 to hot A.C. Illumination of lamp 22 thus indicates that no control functions are being exercised on the remote control system.

It will be noted, moreover, during stand-by condition, contact 107b of tone receiver 106 is connected through normally closed contacts 91a and 91c to energize relay 95. If a signal is being transmitted over supervisory channel A, modulating the tone to cause pole 107a to make contact with contact 107b, actuating coil 95a is connected between positive ground on pole 107a and negative voltage. If no such signal is received on the supervisory channel, and relay 95 remains unactuated, positive ground connected to contact 98a is connected to contact 98c and thence through stop lamp 19 to negative voltage lighting stop lamp which thus indicates the condition of the pump as "not running." If relay 95 is actuated, on the other hand, contacts 98a and 98c are opened and contacts 98a and 98b are closed. Since contact 98b is connected through lamp 17 to negative voltage, lamp 17 is lighted to indicate a running condition at the controlled pump-house.

When a control sequence is initiated by depressing either push buttons 10, 13, or 14, the consequent actuation of relay 85 opens the connection between contact 107b and coil 95a. In the event relay 95 had been actuated, since relay 85 operates relatively rapidly compared to the release of relay 95, a locking circuit for relay 95 is established before it can release in order to keep the indicating lamp 17 lighted to indicate the running condition of the pump at the initiation of the control function. This circuit includes a positive ground connection to contact 86b of relay 85 the associated contact 86a of which is connected to contact 97a in turn connected to contact 97b when relay 95 is actuated. The last contact is connected through the actuating coil 95a to negative voltage. As a safeguard to insure relay 95 remains operated, if previously actuated upon initiation of a control function, a second ground connection to contact 97a is provided by a connection to contact 73b of master relay 65, the associated contact 73a being tied to ground.

Control of check code confirmation lamp 16 is under the influence of check code confirmation relay 200 through contacts 201a and 201b which when closed complete a circuit from ground at contact 201a through contacts 87b and 87a of relay 85 and lamp 16 to negative voltage.

The permissive start lamp 18 is under the control of relay 205, contact 206a of which is connected to ground (positive voltage) and contact 206b of which is connected through contacts 88b and 88a of relay 85 and actuating coil 100a of permissive start indicating relay 100 to negative voltage. Contact 101a of permissive start indicating relay 100 is connected to positive ground while its associated contact 101b is connected through permissive start lamp 18 to negative voltage. Thus, actuation of relay 205 causes actuation of permissive start indicating relay 100 which in turn causes lamp 18 to light. A locking circuit is provided to hold relay 100, once actuated, provided relay 95 is unactuated, through connection of ground at contact 96a of relay 95 and connection of contact 96c via contacts 49a and 49c to contact 102b with which the associated contact 102a is connected to the ground side of winding 100a. A second holding circuit is provided for relay 100 through a connection from contact 102b to contact 64b of relay 50 which is associated with contact 64a connected to ground via contacts 53a and 53b of relay 50 when the latter is actuated.

Suction pressure lamp 20 is under the control of suction pressure relay 75. Thus, when relay 75 is actuated, its contact 77b, which is connected to positive ground, makes with its associated contact 77a connected through lamp 20 to negative voltage.

Similarly, discharge pressure lamp 21 is under the control of discharge pressure control relay 80; the contact 82b of which is connected to positive ground and upon actuation of relay 80 makes with its associated contact 82a which is connected through discharge pressure lamp 21 to negative voltage.

Stop, not running, lamp 19 is also under the control of stop code confirmation relay 210, the contact 211a of which is connected to positive ground while its associated contact 211b is connected through contacts 89b and 89a of relay 85 and lamp 19 to negative voltage.

Controlled station components

The controlled station (see FIGURES 7–10, inclusive), such as controlled station A, includes a control code receiver, a controlled unit, a confirmation code generator, a controlled unit sequence timer together with a tone receiver and a tone transmitter as well as the associated equipment in the pump house at which controlled station A is located.

Control code receiver components

Figure 7:
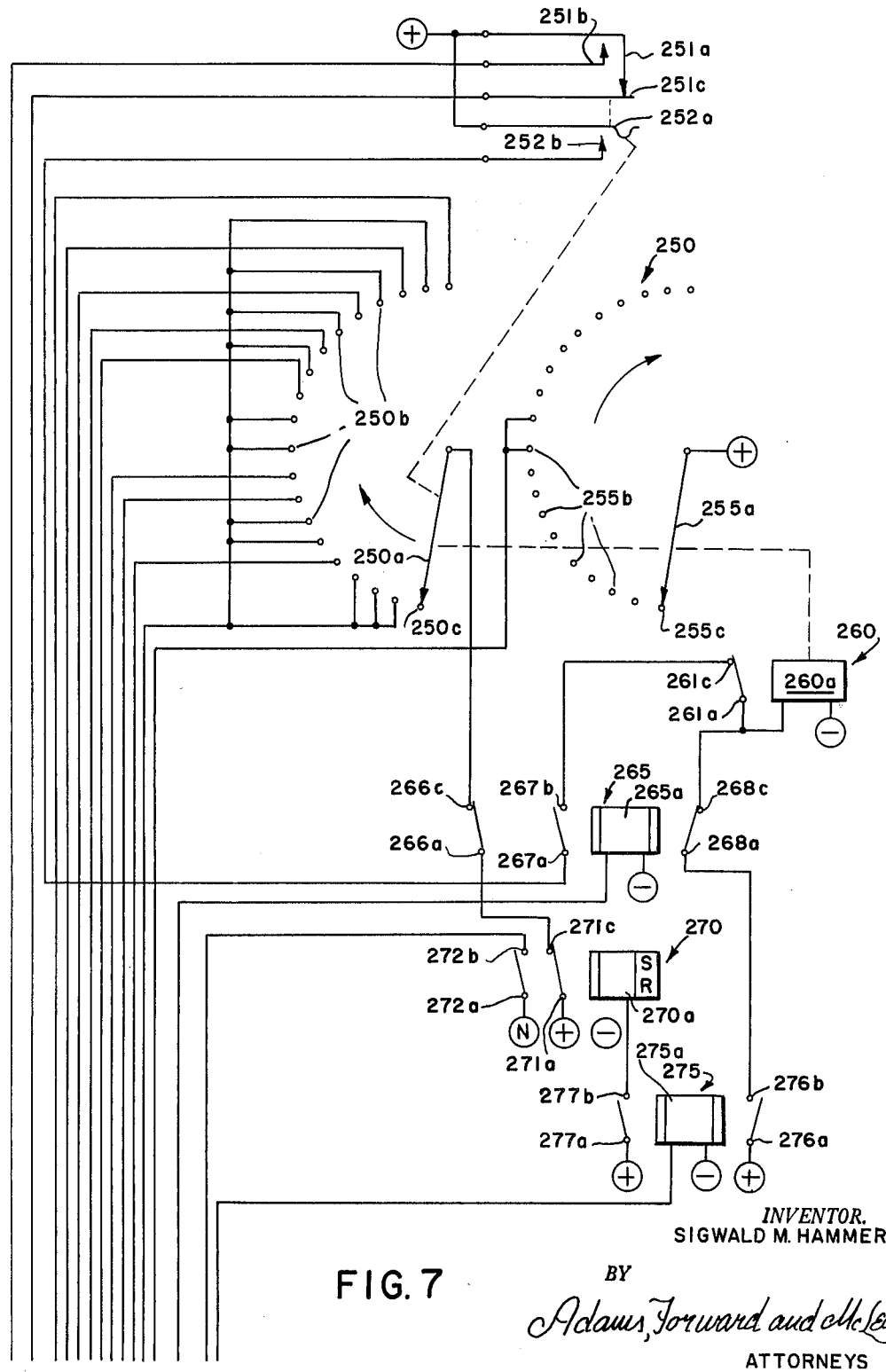
FIGURE 7 is a schematic diagram of a portion of a controlled unit A shown in FIGURE 1.

Basically, referring to FIGURE 7, the control code receiver involves a conventional stepping switch 250 having off normal switches 251 and 252, a homing relay 265, a wiper relay 270 and a motor magnet control relay 275, as well as a motor magnet 260.

Stepping switch 250 is a two bank contact switch having a first wiper arm 250a and a second wiper arm 255a. Each wiper 250a and 255a is arranged sequentially to make contact with separate banks of contacts 250b and 255b, wiper 250a making contact sequentially with a home position contact 250c and then in sequence through nineteen bank contacts 250b and wiper 255a making contact sequentially with a home contact 255c and then in sequence through nineteen bank contacts 255b. Wipers 250a and 255a are ganged together and are driven by motor magnet 260, such that upon each actuation of motor magnet 260 wipers 250a and 255a move from one contact to the next contact in the sequence of its associated bank 250b and 255b.

The off normal switches 251 and 252 are actuated by movement of wipers 250a and 255a from their home positions at contacts 250c and 255c. Switch 251 includes three contacts 251a, 251b and 251c, of which contacts 251a and 251b are normally open and contacts 251a and 251c are normally closed. Switch 252 includes a pair of normally open contacts 252a and 252b. Upon wipers 250a and 255a stepping off their home position at contacts 250c and 255c, the connection between contacts 251a and 251c is broken, while contacts 251a and 251b make connection, as also do contacts 252a and 252b.

Motor magnet 260 is provided with a pair of normally closed contacts 261a and 261c and with an actuating coil 260a.

Homing relay 265, which is provided with an actuating coil 265a is provided with two pairs of normally closed contacts, that is, contacts 266a and 266c and contacts 268a and 268c. Relay 265 is also provided with a pair of normally open contacts 267a and 267b.

Wiper control relay 270, which is provided with an actuating coil 270a has one pair of normally closed contacts 271a and 271c and one pair of normally open contacts 272a and 272b and is of the slow release type.

Motor magnet control relay 275 has an actuating coil 275a and two pairs of normally open contacts 276a and 276b and 277a and 277b.

Controlled unit components

Figure 8:
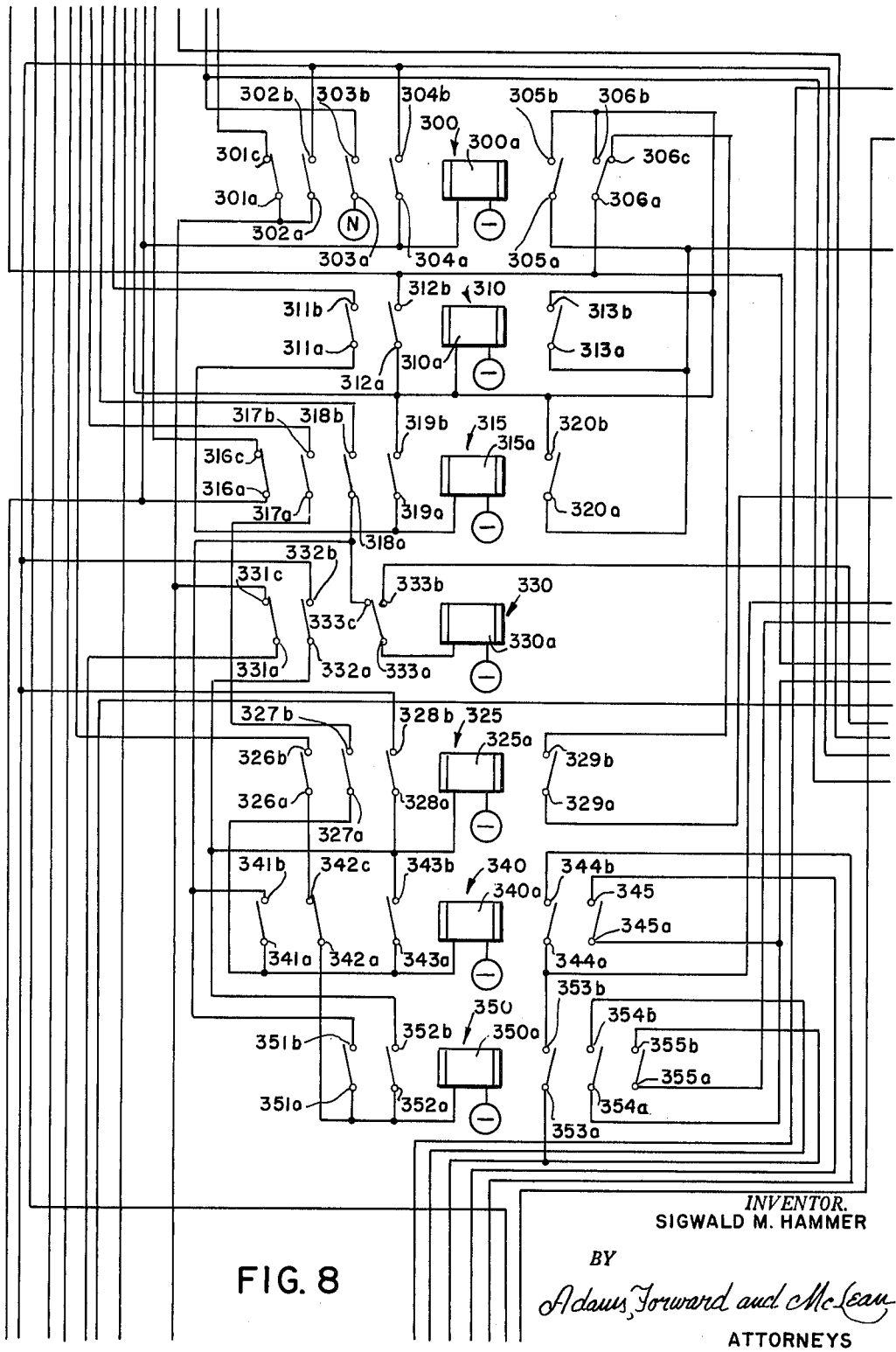
FIGURE 8 is a schematic diagram of another portion controlled unit A.
Figure 9:
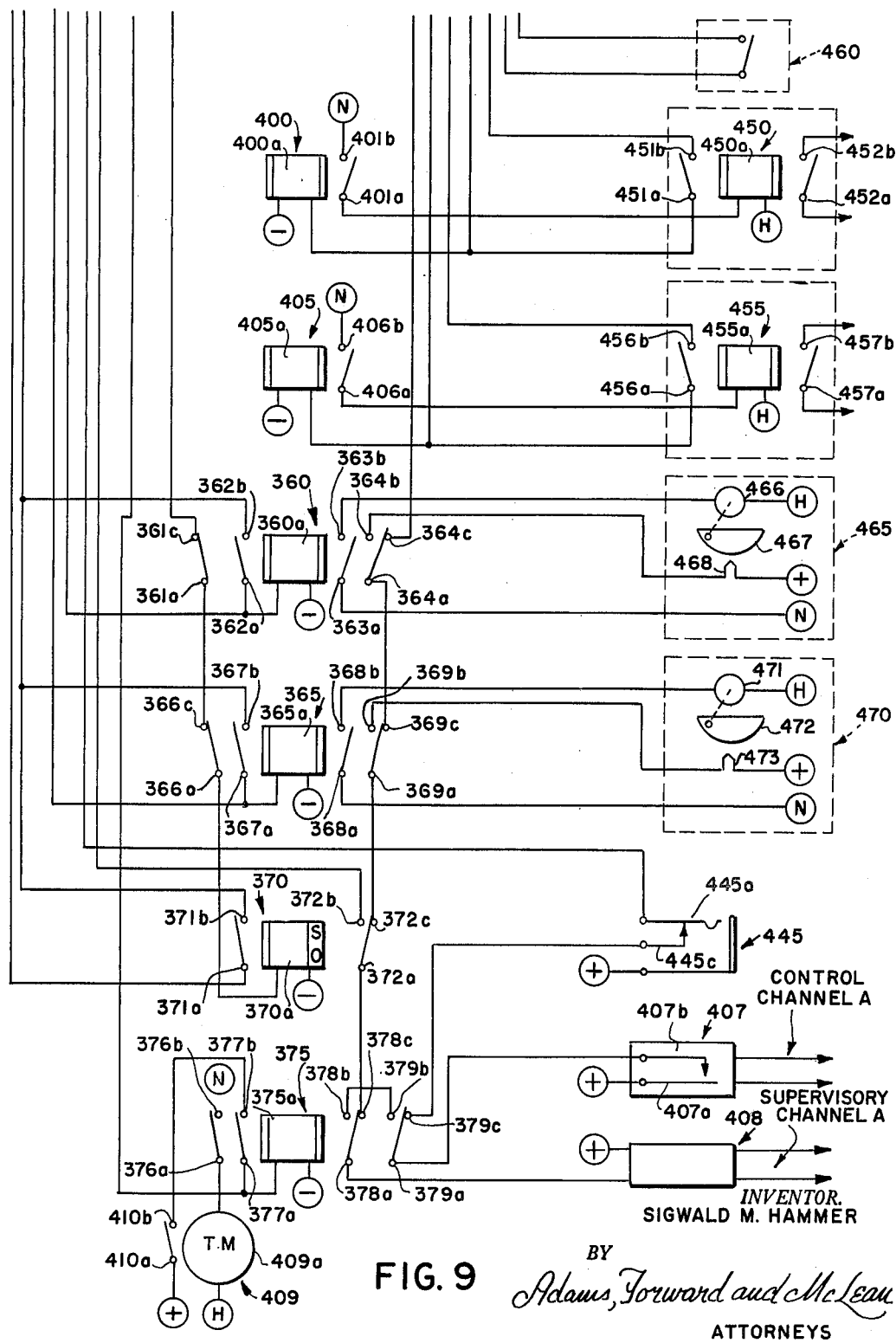
FIGURE 9 is a schematic diagram of still another portion of controlled unit A.

The controlled unit, referring to FIGURES 8 and 9, includes a number of relays which are responsive to the various codes and to the transmission of faulty codes or extraneous signals which may be received which are mostly included in FIGURE 8 and a group of controlled relays for effecting the various functions demanded by the codes which are shown in FIGURE 9.

The code response relays include a fault detector and lock-out relay 300 for effecting lock-out of the equipment upon a faulty code being received, a relay 310 responsive to a first correct code group, a relay 315 responsive to a second correctly transmitted received code group, a master correct code response relay 325 responsive to a correctly transmitted and received third group of the code after previous correct transmission and reception of the first two groups for any of the third code groups utilized in dialing the check code, the start code and the stop code, a relay 330 responsive to a correct check code third group, a relay 340 responsive to a correct third code group for the start code, a relay 350 responsive to a correctly transmitted and received third code group of the stop code, a relay 360 (see FIGURE 9) responsive to a correct third code group in the suction pressure code, a relay 365 (see FIGURE 9) responsive to a correct third code group of the discharge pressure code, a relay 370 (see FIGURE 9) responsive to an improperly received long pulse; and a relay 375 responsive to a special code for setting up control channel A and the supervisory channel A in a loop circuit.

Fault detector and lock-out relay 300 is provided with an actuating coil 300a, four pairs of normally open contacts 302a and 302b, 303a and 303b, 304a and 304b, 305a and 305b, one pair of normally closed contacts 301a and 301c and a group of three contacts 306a, 306b and 306c of which 306a and 306c are normally closed and 306a and 306b are normally open.

The first code group response relay 310 is provided with an actuating coil 310a and three pairs of normally open contacts 311a and 311b, 312a and 312b and 313a and 313b.

Second code groups response relay 315 is provided with one pair of normally closed contacts 316a and 316c and with four pairs of normally open contacts 317a and 317b, 318a and 318b, 319a and 319b and 320a and 320b, as well as an actuating coil 315a.

Master correct code response relay 325 which has an actuating coil 325a is provided with four normally open pairs of contacts 326a and 326b, 327a and 327b, 328a and 328b and 329a and 329b.

Check code group response relay 330 which has an actuating coil 330a is provided with one pair of normally closed contacts 331a and 331c, one pair of normally open contacts 332a and 332b and a group of three associated contacts 333a, 333b and 333c and which 333a and 333c are normally closed and 333a and 333b are normally open, contact 333a making with contact 333b before breaking with contact 333c.

Start code response relay 340, which has an actuating coil 340a, is provided with four pairs of normally open contacts 341a and 341b, 343a and 343b, 344a and 344b and 345a and 345b and one pair of normally closed contacts 342a and 342c.

Stop code response relay 350, which has an actuating coil 350a, is provided with five pairs of normally open contacts 351a and 351b, 352a and 352b, 353a and 353b, 354a and 354b and 355a and 355b.

Suction pressure code response relay 360 is provided with an actuating coil 360a, one pair of normally closed contacts 361a and 361c, two pairs of normally open contacts 362a and 362b and 363a and 363b and a group of three associated contacts 364a, 364b and 364c, of which contacts 364a and 364c are normally closed and of which contacts 364a and 364b are normally open.

Discharge pressure code response relay 365, which has an actuating coil 365a, is provided with one pair of normally closed contacts 366a and 366c, two pairs of normally open contacts 367a and 367b and 368a and 368b, and three associated contacts 369a, 369b and 369c, of which contacts 369a and 369c are normally closed and contacts 369a and 369b are normally open.

Long pulse detector relay 370, which is a slow to operate relay, has an actuating coil 370a, one pair of normally open contacts 371a and 371b and three associated contacts 372a, 372b, 372c, of which contacts 372a and 372b are normally open and of which contacts 372a and 372c are normally closed.

Duplex channel (loop test) relay 375 is provided with two pairs of normally open contacts 376a and 376b and 377a and 377b and two groups of three associated contacts 378a, 378b and 378c and 379a, 379b and 379c, of which contacts 378a and 378c, and contacts 379a and 379c are normally closed and contacts 378a and 378b and contacts 379a and 379b are normally open.

The control relays associated with the controlled unit include a start relay 400 and a stop relay 405. Start relay 400 has an actuating coil 400a and one pair of normally open contacts 401a and 401b. Stop relay 405 has an actuating coil 405a and one pair of normally open contacts 406a and 406b.

The controlled unit further includes a tone receiver 407 which has its input connected to a micro-wave receiver operating on control channel A. The micro-wave receiver includes suitable detector circuits for detecting the modulating tone and for operating a pair of contacts 407a and 407b in tone receiver 407 which are normally open and are operable to a closed position upon a change in the modulating tone representing a signal transmitted on control channel A.

A tone transmitter 408 is provided connected to a micro-wave transmitter operating on supervisory channel A and is effective upon closure of its input circuit to change a tone modulating the micro-wave signal from one frequency to another.

The controlled unit further includes a loop test timer 409 including a timer motor 409a which resets upon de-energization and a pair of of timer operated contacts 410a and 410b which are closed only during the operation of the time period.

*Confirmation code generator components*

The confirmation code generator (see FIGURE 10) includes a rotary selector switch 415 which is a modified stepping switch consisting of a wiper arm 415a having a home position at a contact 415c and operable in sequence through sixteen contacts 415b of a forty contact bank back to home position on contact 415c. Wiper arm 415a is driven by A.C. synchronous motor 420 at a rate of 15 r.p.m. Thus one cycle of operation of wiper 415a from home position at contact 415c back to home position requires four seconds at a contact making rate of 10 contacts per second. The modification of switch 415 alluded to above a substitution of 15 r.p.m. motor 420 for the conventional motor magnet.

Switch 415 further includes two off normal switches 417 and 418 which are actuated upon movement of wiper 415a away from home position. Off normal switch 417 includes contacts 417a, 417b and 417c, and switch 418 includes contacts 418a and 418b. At home position of wiper arm 415a, contacts 417a and 417c are normally closed while contacts 417a and 417b are normally open, and contacts 418a and 418b are normally open. Upon movement of wiper arm 415a off contact 415c the connection between contacts 417a and 417c is broken while connections are made between contacts 417a and 417b and between contacts 418a and 418b.

A brake circuit consisting of a rectifier 421 and resistor 422 in series for braking motor 420 is also included in the confirmation code generator.

*Controlled unit sequence timer components*

The controlled unit sequence timer (see FIGURE 11) includes six circular cams 425, 426, 427, 428, 429 and 430 which are commonly mounted affixed on a shaft 431 driven by a synchronous motor 432 which is operable at a rate of 2 revolutions per minute thus providing a controlled sequence cycle of 30 seconds. Each of cams 425, 426, 427, 428, 429 and 430 is arranged to operate one of six cam operated switches 435, 436, 437, 438, 439 and 440, respectively, and, to this end is provided with one or more notches cut in its peripheral switch operating surface on which the armature of the associated switch rides.

Cam 425 is provided with a 12° notch in which an armature 435a rides during the first second of operation from stand-by condition. Cam 426 is provided with a 24° notch through which an armature 436a rides during the twenty-sixth and twenty-seventh seconds of the controlled sequence cycle. Cam 427 is provided with two notches of 36° each through which an armature 437a rides during the fifth through the seventh seconds and during the twenty-fourth through the twenty-sixth seconds of the controlled sequence cycle. Cam 428 is provided with a single notch of 24° through which the associated armature 438a rides during the tenth and eleventh seconds of the operating sequence. Cam 429 is provided with eight equally spaced notches through which an armature 439a rides to make and break its associated switch 439 eight times during the cycle of operation of the controlled unit sequence timer, armature 439a remaining between notches at stand-by condition. Cam 430 is provided with a notch of 96° through which its associated armature 440a rides during the twentieth to the twenty-eighth second of operation.

Switch 435 has a contact 435c which armature 435a closes upon when riding on the unnotched portion of the surface of cam 425. Armature 436a of switch 436 has two contacts associated with it, a contact 436b and a contact 436c, armature 436a being normally closed with contact 436c but opening that contact and making connection with contact 436b upon dropping into the notch in cam 426. Armature 437a of switch 437 has a single contact 437b associated with it with which it makes connection upon dropping into either notch in cam 427. Armature 438a of switch 438 has two contacts associated with it, contact 438b and contact 438c. Connection between armature 438a and contact 438c being normally closed but opening upon dropping of armature 438a into the notch in cam 428 it breaks contact with contact 438c at which time armature 438a closes its normally open connection with contact 438b. Armature 439a of switch 439 has associated with it a contact 439b which closes each time armature 439a drops into a notch on cam 429. Armature 440a of switch 440 has a single contact 440b associated with it which closes when armature 440a rides along the notch in cam 430.

*Pump house components*

The pump house at remote station A includes certain control and indicating components which are employed in the supervisory control system. These are (see FIGURE 9) a motor start relay 450, a motor stop relay 455, an auxiliary switch 460, a suction pressure transmitter 465, and a discharge pressure transmitter 470.

Motor start relay 450 includes an actuating coil 450a and two pairs of normally open contacts, one associated pair being designated 451a and 451b and the other 452a and 452b. Motor stop relay 455 similarly has an actuating coil 455a and two pairs of normally open contacts, i.e., contacts 456a and 456b and contacts 457a and 457b.

Auxiliary switch 460 is normally open and is mechanically driven to closed position when the pump is running.

Pressure transmitters 465 and 470 are identical except transmitter 465 is coupled in the intake side of the pump while transmitter 470 is coupled in the pump outlet.

Transmitter 465 includes an A.C. synchronous motor 466 connected to drive a cam 467 which engages a normally closed switch 468 to open the switch. Transmitter 470 similarly includes a motor 471, a cam 472 driven by motor 471 and a normally closed switch 473 engaged by cam 472.

*Control code receiving circuits*

Tone receiver 407 has its contact 407a connected to positive ground while its normally open contact 407b is connected through normally closed contacts 379a and 379c of loop test relay 375, through the normally closed contacts 445c and 445a of a test jack 445, thence through normally closed contacts 331a and 331c of check code response relay 330, thereafter through normally closed contacts 301a and 301c of fault detector and lock-out relay 300, and through actuating coil 275a of motor magnet control relay 275 to negative voltage.

The normally open contacts 276a and 276b of motor magnet control relay 275 when closed connect positive ground from contact 276a through normally closed contacts 268a and 268c of homing relay 265 and actuating coil 260a of motor magnet 260 to negative voltage. Accordingly, the closure of contacts 407a and 407b upon a change in the modulating tone on control channel A actuates relay 275 and hence motor magnet 260 to cause wipers 250a and 255a to step off their home positions at contacts 250c and 255c, making one step to the next adjacent contacts in their respective bank contacts 250b and 255b. Further actuation of contacts 407a and 407b will cause wipers 250a and 255a to make further steps along their banks until they return to their home positions by the operation of homing relay 265.

The first three contacts with which wiper 250a makes connection after stepping off its home position at contact 250c together with the fifth, sixth, ninth, tenth, twelfth, fourteenth, sixteenth and eighteenth bank contacts 250b are commonly connected to negative voltage through actuating coil 300a of fault detector and lock-out relay 300. The ninth and tenth bank contacts 255b with which wiper 255a makes connection off home position are also wired together and connected to negative voltage through actuating coil 300a of fault detector and lock-out relay 300 via an intermediate connection through contacts 316c and 316a of second code group response relay 315. Wiper 255a is at all times connected to positive ground; however, wiper 250a is connected to positive ground through normally closed contacts 266c and 266a of homing relay 265 and through normally closed contacts 271c and 271a of wiper control relay 270, contact 271a being tied to positive ground.

Wiper control relay 270 has its actuating coil 270a connected between negative voltage and contact 277b of motor magnet control relay 275, the associated contact 277a being connected to positive ground. Accordingly, when motor magnet control relay 275 is actuated by closure of tone receiver contacts 407a and 407b, wiper control relay 270 is also actuated. Since relay 270 is a slow to release relay the break in the circuit putting ground on wiper 250a afforded by the opening of contacts 271a and 271c is not restored during a group of pulses which are closely spaced. Thus if four pulses such as in the first group of the various control codes are received, wiper 250a will first make connection to ground on the fourth bank contact 250b, passing the first three without placing ground on them.

*Control code responsive circuits*

Certain of the contacts of bank contacts 250b engaged by wiper 250a are utilized to actuate the various code responsive relays. Thus, the fourth bank contact 250b engaged by wiper 250a after leaving home position at contact 250c is connected to negative voltage through actuating coil 310a of first code group responsive relay 310. The eighth bank contact 250b from home position of wiper 250a is connected to negative voltage through the serial connection of normally open contacts 311b and 311a of relay 310 and actuating coil 315a of second code group responsive relay 315. The eleventh bank contact 250b reached by wiper 250a after leaving home position is connected to negative voltage through normally open contacts 318b and 318a of the second code group responsive relay 315, through normally closed contacts 333c and 333a of check code responsive relay 330 and through actuating coil 330a of check code responsive relay 330. The thirteenth bank contact 250b from home position of wiper 250a is connected through normally open contacts 317b and 317a of relay 315 and normally open contacts 327b and 327a of master correct code response relay 325 to negative voltage through start code response relay 340 actuating coil 340a. The fifteenth bank contact 250b from home position of wiper 250a is connected through normally open contacts 326b and 326a of master correct code response relay 325 and through normally closed contacts 342c and 342a of start code response relay 340 to negative voltage through actuating coil 350a of stop code response relay 350. The seventeenth bank contact 250b from home position of wiper 250a is connected through actuating coil 360a of suction pressure code response relay 360 to negative voltage. The nineteenth bank contact 250b from home position of wiper 250a is connected to negative voltage through actuating coil 365a of discharge pressure code responsive relay 365. The seventh bank contact 250b from home contact 250c is connected to negative voltage through actuating coil 375a of loop test relay 375.

First code group responsive relay 310 is provided with a locking circuit through the connection of the ground side of its actuating coil 310a to its contact 312a which has its associated contact 312b connected to off normal contact 251b. Since off normal contact 251a is connected to positive ground, as soon as wiper 250a leaves its home position, ground is potentially provided for the locking circuit for relay 310.

Contact 312a is also connected to contact 319b of second code group response relay 315, the associated contact 319a with which is connected through actuating coil 315a to negative voltage to provide a potential locking circuit for second code group responsive relay 315 upon actuation of first code group responsive relay 310.

Check code group responsive relay 330 is provided with a locking circuit upon actuation as contact 333a breaks from connection with contact 333c after making connection with contact 333b which is connected to contact 438c of cam operated switch 438, normally closed with armature 438a, which is in turn connected to off normal contact 251b of the control code receiver. As pointed out before contact 251b makes connection with positive ground on contact 251a after movement of wiper 250a off normal position.

Contacts 332a and 332b of check code responsive relay 330 are arranged to provide an energizing circuit for master correct code response relay 325 by connecting ground from armature 436a of cam operated switch 436 through its normally closed contact 436c to contact 332b while contact 332a is connected to negative voltage through the actuating coil 325a of master correct code response relay 325. A locking circuit for relay 325 is provided by connection of contact 328b of relay 328 to contact 436c of switch 436 and by connecting contact 328a through actuating coil 325a to negative voltage.

Actuation of start code response relay 340 is arranged to provide a second actuating circuit for check code response relay 330 by a connection from contact 333c of check code relay 330 through contacts 341b and 341a to the ground side of actuating coil 340a. A potential locking circuit for start code relay 340 is provided by a connection from contact 328a of correct code response relay to contact 343b of start code response relay 340, the associated contact 343a being connected to the ground side of actuating coil 340a.

Actuation of stop code response relay 350 provides a third actuating circuit for check code response relay 330 by a connection from contact 333c of relay 330 through contacts 351b and 351a to the ground side of actuating coil 350a. A locking circuit for stop code response relay 350 is provided by a connection from contact 328a of master correct code response relay 325 to contact 352b, the associated contact 352a being connected to the ground side of actuating coil 350a.

A locking circuit for suction pressure code response relay 360 is provided by a connection to the ground on armature 436a by connecting contact 436c, to contact 362b the contact associated with which, that is, contact 362a is connected to the ground side of actuating coil 360a.

A similar locking circuit is provided for discharge pressure code responsive relay 365 by connection of contact 436c to contact 367b with which contact 367a connected to the ground side of coil 365a is associated.

Fault detector and lock-out relay 300 is provided with a locking circuit by connection of its contact 304b to contact 436c associated with cam switch 436. Contact 304a associated with contact 304b being connected through actuating coil 300a to negative voltage.

*Controlled station actuating circuits*

Wiper control relay 270 also functions to provide an initiating circuit for starting motor 432 of the controlled unit sequence timer by connection of relay contact 272a to neutral A.C. and connection of its contact 272b through timer motor 432 to a hot A.C. line. A locking circuit for timer motor 432 is provided by a connection of contact 435c to the neutral A.C. side of motor 432 which is completed to neutral A.C. upon closure of armature 435a with contact 435c at the end of the first second of operation of the controlled unit sequence timer, since armature 435a is connected to neutral A.C.

A homing circuit for the control code receiver is provided through a connection from off normal contact 252b through contacts 267a and 267b of homing relay 265 and contacts 261c and 261a of motor magnet 260 through actuating coil 260a to negative voltage. Since contact 252a is connected to positive ground, when wipers 250a and 255a are off home position the connection between contacts 252a and 252b sets up a potential circuit which is closed upon the actuation of homing relay 265.

The latter can be actuated in a first circuit by connection of coil 265a between negative voltage and contact 438b of cam operated switch 438 and in a second circuit by connection of contact 436b of cam operated switch 436 to contact 438b. Armature 438a, which makes connection with contact 438b at the tenth through the eleventh seconds of the controlled unit time sequence, is connected to off normal contact 251b which has positive ground voltage on it through its connection to off normal contact 251a when wipers 250a and 255a are off home position. Accordingly, at the tenth second when armature 438a closes with its contact 438b, ground from contact 251a is placed on actuating coil 265a of homing relay 265 to cause its operation. Similarly, during the twenty-sixth to the twenty-seventh seconds of the controlled unit time sequence the closure of armature 436a, which has ground directly connected to it, with its associated contact 436b places ground on actuating coil 265a of homing relay 265 a second time during the cycle. In each case, as contacts 267a and 267b close, connecting coil 260a of motor magnet 260 between ground and negative voltage, each actuation of the motor magnet causes wipers 250a and 255a to take a further step and opens contacts 261a and 261c releasing magnet 260. As the contacts again close upon release of magnet 260 they function as interrupters to cause the magnet to step wipers 250a and 255a rapidly back to home position on contacts 250c and 255c, respectively, which causes an interruption in the circuit established for homing relay 265 by breaking the connection between contacts 251a and 251b.

A second circuit for initiating operation of the controlled unit sequence timer is provided by contacts 303a and 303b of fault detector and lock-out relay 300 which upon closure connect neutral A.C. at contact 303a to the timer motor 432 and to contact 435c of switch 435 by reason of a connection of contact 303b to the latter pair and contact 272b of relay 270.

Contacts 302a and 302b of fault detector and lock-out relay 300 are connected in a circuit for actuating long pulse detector relay 370 by providing a connection between contact 302b contact 436c which is normally closed upon ground at armature 436a and by providing a connection from contact 302a to negative voltage through actuating coil 370a of long pulse detector relay 370 via the serial connection of contacts 361c and 361a of suction pressure code responsive relay 360 and contacts 366c and 366a of discharge pressure code responsive relay 365. Contact 302a is also connected to contact 301a and hence potentially connected to ground at contact 407b of tone receiver 407.

Contacts 304a and 304b provide a locking circuit for fault detector and lock-out relay 300 through connection of contact 304a to the ground side of actuating coil 300a and through connection of contact 304b to contact 436c.

*Confirmation code generating circuits*

Cam switch 437 is arranged to initiate operation of the confirmation code generator twice during the operating cycle of the controlled unit sequence timer. To accomplish this, armature 437a is connected to neutral A.C. while its associated contact 437b is connected through motor 420 to the hot A.C. line. Accordingly, when armature 437a rides in the notches in cam 427 during the fifth to the seventh seconds of the operating cycle and during the twenty-fourth to the twenty-sixth seconds of the operating cycle motor 420 is energized to initiate a cycle of operation of the confirmation code generator. A brake circuit consisting of a rectifier 422 and a resistor 421 connected in series between the neutral side of motor 420 and contact 435c is provided. Since armature 435a is connected to neutral A.C. the brake circuit when not shunted is effective during each controlled cycle to brake motor 420.

As wiper 415a leaves its normal position on contact 415c, contact 418b which is also connected to the neutral side of motor 433 makes connection with contact 418a, which is also connected to contact 435c, thereby locking motor 420 until it has completed its cycle of operation and wiper 415a is back at the home position on contact 415c breaking the connection between contacts 418a and 418b. Since motor 420 requires four seconds for one cycle of operation and since each notch on cam 427 has a two-second duration, the connection at armature 437a initiating operation of motor 420 will have broken. The brake circuit including rectifier 422 and resistor 421 is effectively restored to stop motor 420 at the time contacts 418a and 418b open.

It will be further observed that actuation of motor 420 driving wiper 415a off its home position on contact 415c is utilized to change the supervisory circuit connection as follows: Tone transmitter 408 ordinarily has its input connected in series through normally closed contacts 378a and 378c of loop test relay 375, normally closed contacts 372a and 372c of long pulse detector relay 370, normally closed contacts 369a and 369c of discharge pressure code response relay 365, normally closed contacts 364a and 364c of suction pressure code response relay 360, normally closed contacts 417a and 417c of the off normal switch associated with rotary selector 415, normally open auxiliary switch 460 through normally closed contacts 251c and 251a associated with the control code receiver to positive ground providing a return to the tone transmitter 408. Thus, under stand-by conditions, when the pump is running the auxiliary switch 460 associated with it is closed, a closed input circuit is provided for tone transmitter 408 causing the tone transmitter to modulate its output tone to a different frequency indicating that the pump is running. If the pump is not running, the circuit is open and no modulation of the tone is provided, thus indicating the pump is not running.

Quite evidently upon any actuation of the control code receiver, the input circuit to tone transmitter 408 is broken. During the periods of the controlled unit sequence timer cycle in which the confirmation code generator is actuated, the breaking of contacts 417a and 417c also interrupts the input circuit to tone transmitter 408, but the closure of contacts 417a and 417b connects wiper 415a, which is connected to contact 417b, to the ungrounded side of the tone transmitter input circuit.

Ground connections for completing the circuit are provided by connections made to various bank contacts 415b in the bank wiped by wiper 415a as it makes a cycle between home position at contact 415c and returns to there. Thus, the second and fourth contacts 415b removed from home position are connected together and to each contacts 305a, 313a and 320a associated with fault detector and lock-out relay 300, first code group response relay 310 and second code group response relay 315, respectively, the associated contacts 305b, 313b and 320b of which are commonly connected to contact 312a of first code group response relay 310 and to contact 306b of fault detector and lock-out relay 300. Contact 306a, associated with contact 306b, in turn is connected to contact 251b, as also is contact 312b associated with contact 312a. As noted before contact 251b is associated with contact 251a which is grounded.

A ground connection for the sixth and eighth bank contacts 415b of the confirmation code generator is provided by connecting these together to contact 329a of master correct code response relay 325. Contact 329b is connected through contacts 306c and 306a of fault detector and lockout relay 300 to off normal contact 251b of the control code receiver which is pointed out before during the period of the confirmation code generator operation is closed with its associated contact 251a connected to ground.

The tenth and twelfth bank contacts 415b of the confirmation code generator are connected together and to contacts 344a and 353b of start code response relay 340 and of stop code response relay 350, respectively. Contact 344b associated with contact 344a is connected in turn through normally open contacts 451b and 451a in motor start relay 450 to contact 345b of start code response relay 340, the associated contact 345a of which is connected to contact 440b of cam operated switch 440 which closes with its associated armature 440a during the twentieth through the twenty-eight second of the operating cycle. Armature 440a in turn is connected to off normal contact 251b associated with the control code receiver.

The fourteenth and sixteenth bank contacts 415b are connected together and to contact 355a of stop code response relay 350. Contact 355b, which is associated with contact 355a, and contact 353a, which is associated with contact 353b to which the tenth and twelfth bank contacts 415b are connected, are connected together through normally open contacts 456b and 456a on motor stop relay 455 and thence to contact 354b of stop code response relay 350 with which the associated contact 354a is connected to contact 440b of cam operated switch 440.

Figures 10, 11:
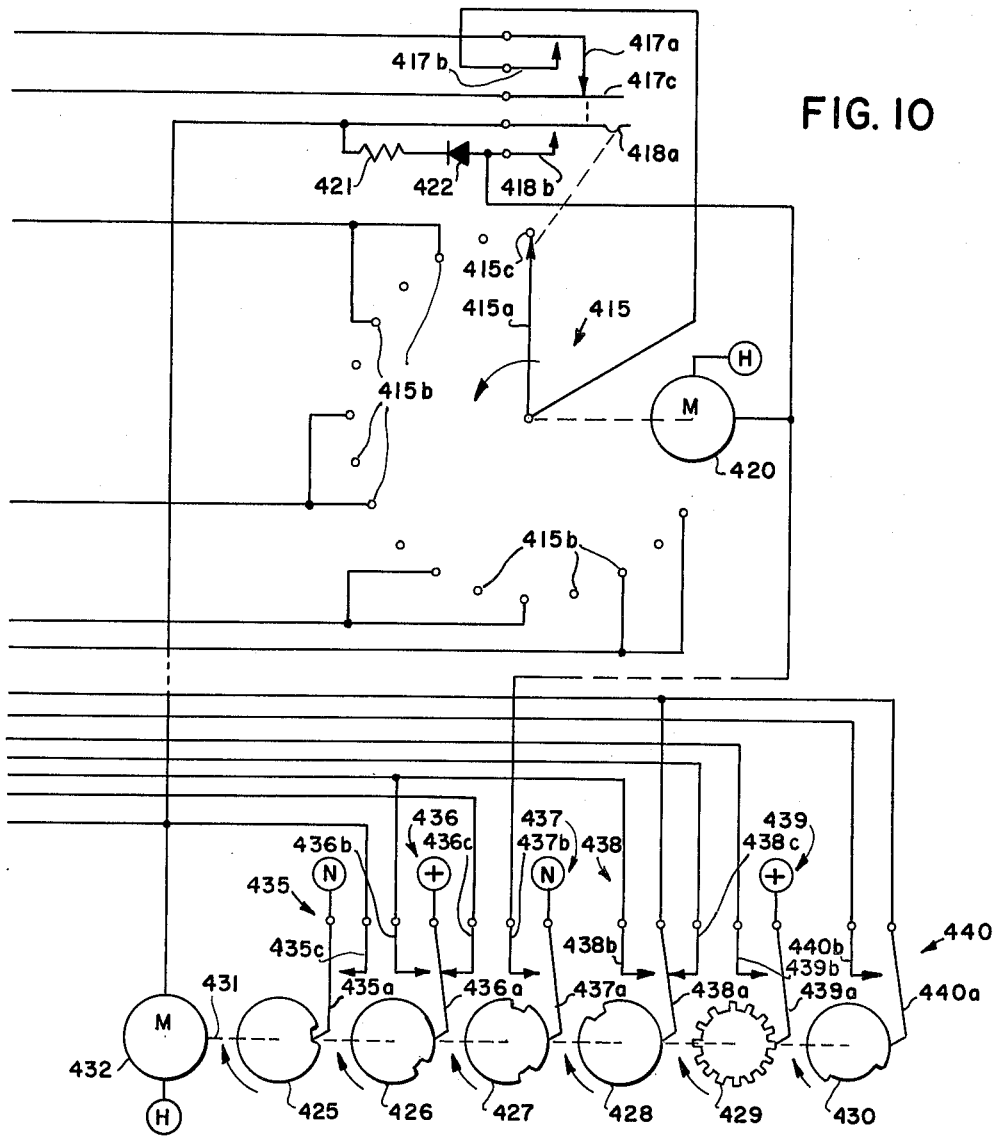
FIGURE 10 is a schematic diagram of yet a further portion of controlled unit A.
FIGURE 11 is a schematic diagram of the remainder of controlled unit A.

It will be noted referring to FIGURE 10, the ground returns for the tenth, twelfth, fourteenth and sixteenth bank contacts 415b are dependent upon the actuation in the case of the tenth and twelfth contacts 415b of motor start relay 450 associated with the pump and in the case of all four contacts upon the actuation of motor stop relay 455 associated with the pump. An actuating circuit for motor start relay 450 is provided by connection of contact 401a of start relay 400 through actuating coil 450a of relay 450 to the hot A.C. line. Neutral A.C. is connected to contact 401b associated with contact 401a. Actuating coil 400a of start relay 400 is connected between negative voltage and contact 345b of start code response relay 340. Motor stop relay 455 is provided with a similar actuating circuit involving a connection from contact 406a through actuating coil 455a to the hot A.C. line. Neutral A.C. is connected to contact 406b associated with contact 406a. Actuating coil 405a is in turn connected between negative voltage and contact 354b of stop code response relay 350. As noted above contacts 345a and 354a of start and stop code response relays 340 and 350, respectively, are connected to contact 440b.

Associated contacts 452a and 452b of motor start relay upon closure complete the pump motor start circuits, and similar contacts 457a and 457b when closed complete the pump motor stop circuits.

Pump suction pressure transmitter 465 is arranged such that contact 363b on suction code response relay 360 is connected through auxiliary motor 466 associated with suction pressure transmitter 465 to hot A.C., while its associated contact 363a is connected to the A.C. neutral line associated with the pump. Motor 466 is a synchronous motor and hence its operation is a function of time. A similar motor in a recording device, such as a null recording servo-amplifier associated with a suction pressure gauge on the pump, is arranged to turn an indicating hand or pointer cooperating with a pressure indicating scale. Switch 468 of pressure transmitter 465 is driven by the recorder motor relative to cam 467 and hence with reference to the existing suction pressure. Accordingly, the time following energization of motor 466 of suction pressure transmitter 465 required for movement of cam 467 to open switch 468 is a measure of the suction pressure. Switch 468 is connected between ground and contact 364b of suction pressure code response relay 360 which closes with contact 364a upon actuation of suction pressure code response relay 360. As pointed out before, contact 364a is connected through contacts associated with suction pressure code response relay 360, long pulse detector relay 370 and loop test relay 375 with tone transmitter 408 input.

Discharge pressure transmitter 470 has its closed switch 473 similarly operated by a pointer associated with a discharge pressure gauge on the pump. Motor 471 of discharge pressure transmitter 470 is connected from hot A.C. in the pump through contacts 368b and 368a of discharge pressure code response relay 365 to neutral A.C. in the pump house. Switch 473 associated with discharge pressure transmitter 470 is connected from positive ground to contact 369b of discharge pressure code relay 365 such that upon actuation of the discharge pressure code response relay, contacts 369a and 369b close to connect switch 473 across the input of tone transmitter 408.

Loop test relay 375 has its contact 376b connected to neutral A.C. and its contact 376a connected through timer motor 409a to hot A.C. supply line such that timer motor 409a will be actuated upon actuation of loop test relay 375. Timer 409 has its contacts 410a and 410b connected to provide a ground for holding loop test relay 375. Thus contact 410a is connected to positive ground while contact 410b is connected to contact 377b of loop test relay 375 and contact 377a of loop test relay 375 is connected through the ground side of coil 375a.

As noted before, contact 407b of tone receiver 407 is connected to contact 379a of loop test relay 375 while the input circuit to tone transmitter 408 is immedately connected to contact 378a of loop test relay 375. The associated contacts 378b and 379b are directly tied together thereby connecting the output circuit of tone receiver 407 directly to the input circuit of tone transmitter 408 upon actuation of relay 375.

*Spurious control channel signal detection and response circuits*

Long pulse detector relay 370, as pointed out before, is a slow to operate relay. The actuating circuit for long pulse detector relay 370 is provided by a connection from contact 331c of check code group response relay 330, which as previously noted is connected in the control circuit from the output of tone receiver 407 which actuates motor magnet control relay 275. Thus contact 331c is connected through contacts 361c and 361a of suction pressure code response relay 360, contacts 366c and 366a of discharge pressure code response relay 365 and coil 370a of relay 370 to negative voltage. If a long pulse, as distinguished from a short, normal signal pulse, is detected at tone receiver 407, long pulse detector 370 is actuated. Since contact 371b is connected to ground through contacts 436c and armature 435a of cam operated switch 436 and since its associate contact 371a is connected to negative voltage through the actuating coil 300a of fault detector and lock-out relay 300, contacts 371a and 371b provide a first actuating circuit for fault detector and lock-out relay 300.

As previously noted, contacts 372a and 372c, which are normally closed, are connected in the input circuit of tone transmitter 408. Thus actuation of long pulse detector relay breaks that circuit but closes contact 372a to contact 372b to provide another potential input circuit for tone transmitter 408 by connection of contact 372b to contact 439b of cam operated switch 439, the associated armature 439a of which is connected to ground.

As noted above the first, second, third, fifth, sixth, ninth, tenth, twelfth, fourteenth, sixteenth and eighteenth bank contacts 250b are commonly connected to negative voltage through actuating coil 300a of fault detector and lock-out relay 300, thus providing a second actuating circuit for relay 300 responsive to movement of stepping switch 250 caused by a single pulse or by any number of pulses not forming a correct control code.

A third actuating circuit for relay 300 is provided by the common connection of the ninth and tenth bank contacts 255b to negative voltage through contacts 316c and 316a and coil 300a which is responsive only to the receipt of one or two spurious pulses at the moment the first two code groups of any control code have been correctly received. In connection with the last circuit it will be noted that wiper 255a is directly grounded.

A locking circuit for relay 300 is provided through its associated contacts 304a and 304b, contact 304a being connected to the ground side of coil 300a and contact 304b being connected to ground through contact 436c and its associated armature 436a which is grounded.

Actuation of relay 300 actuates certain spurious code responsive circuits some of which have been previously suggested. Thus opening of contacts 301a and 301c breaks the actuating circuit for motor magnet control relay 275, and opening of contacts 306a and 306c breaks the confirmation code generating circuit including the sixth and eighth bank contacts 415b of the confirmation code generator. In addition closure of contacts 305a and 305b establishes a potential circuit across the input of tone transmitter 408 by connection of contact 305a to the second and fourth bank contacts 415b and by connection of contact 305b to contact 306b which closes with contact 306a connected to off normal contact 251b as previously noted. Contact 303b is connected through motor 432 to the hot A.C. line while its associated contact 303a is connected to neutral A.C. to provide a second actuating circuit for the controlled unit sequence timer. It will be further noted that contact 302a is connected in the control circuit for motor magnet control relay 275 by a connection to contact 331c, while the associated contact 302b is connected to contact 436c, and hence contacts 302a and 302b provide a second actuating circuit for long pulse detector relay 370.

*Operation stand-by*

In operation, at stand-by condition when no control functions are being sent or confirmed, the control code generator wiper 115a will be at home position on contact 115c as will also be the control code receiver wipers 250a and 255a, the confirmation code generator wiper 415a and the confirmation code receiver wiper 160a. Similarly, the control sequence timer will be unactuated as will also be controlled unit sequence timer and loop test timer. If the pump motor is running, its run switch 460 will be closed thereby closing the circuit to tone transmitter 408 modulating the tone which is then transmitted on supervisory channel A to tone receiver 106, located in control unit A.

Assuming, as stated above, that motor run switch 460 at the pump is closed because the pump is running, contacts 107a and 107b will be closed placing ground on coil 95a of station condition indicating relay 95 thereby causing relay 95 to be in actuated position. Contacts 98a and 98b will therefore be closed to provide an energizing circuit for lamp 17 indicating the running condition of the pump. Stand-by lamp 22 will also be illuminated by a circuit through closed armature 150a and contact 150b. Otherwise all components in control unit A, the control code generator, the control sequence timer and the confirmation code receiver will be unactuated. Similarly all components except motor run switch 460 at controlled unit A will also be unactuated.

If at stand-by condition, on the other hand, motor run switch 460 is open indicating the pump is not running, contacts 107a and 107b at tone receiver 107 located at control unit A will be open and relay 95 will be unactuated. In this event, the connection of contact 98a with contact 98c will complete a circuit illuminating lamp 19 to indicate the stopped condition of the pump. Otherwise, all components of the system except lamp 22 will be unactuated.

*Operation-check code generation*

When it is desired to initiate a control function to control the pump at station A, push button 10 of control unit A is depressed and held for one second, thereby actuating check code establishing relay 25 and master relay 65. Timer motor 147 is energized by the closure of contacts 66a and 66b associated with relay 65, and locks up after one second through the closure of armature 150a with contact 150c which will hold timer motor 147 operating for a period of twenty-nine additional seconds for a total cycle of thirty seconds.

At the same time, the closure of contacts 67a and 67b of relay 65 provides an energizing circuit for control code generator motor 116. As previously described, after motor 116 is energized to move wiper contact 115a off home position at contact 115c, the actuation of off normal contacts 118a and 118b establishes the locking circuit holding code generator motor 116 for a full cycle of operation, that is, for a period of four seconds. As timer motor 147 commences operation the closure of armature 150a and contact 150c also conditions the brake circuit of resistor 120 and rectifier 119, which circuit becomes active as contacts 118a and 118b open at the end of the four second cycle of the control code generator.

As wiper 115a leaves home position 115c, moreover, contacts 117a and 117c are broken disabling all push buttons 10, 13 and 14 of all control units at the control station preventing any other functions from being established to control any unit other than control unit A during the four second cycle of the control code generation. At the same time, contacts 117a and 117b close to lock up master relay 65 and relay 25 through contacts 72a and 72b of master relay 65. Thus, during the four second interval during which the control code is transmitted to the controlled station, relays 25 and 65 are under the control of off normal switches 117 and 118 as is motor 116.

At the end of the sweep, the return of wiper 115a to home position at contact 115c will return the off normal switches to a normal position releasing relay 25 and relay 65 at the same time reestablishing the brake circuit causing motor 116 to stop without coasting.

As previously described, the check code is 4–4–3. This is established upon the bank contacts 115b by the connection of check code establishing relay 25 with the first four, the tenth through the thirteenth and the nineteenth through the twenty-first bank contacts 115b. In the particular switch actually used, although only the thirty contacts utilized are shown, actually forty bank contacts were provided which are swept in a single cycle. Accordingly, the space of five bank contacts between the first four connections and the space of five contacts between the second four and the group of last three contacts connected to the contacts associated with check code relay 25 provide a half-second pause between pulse groups, while the pulsing rate is one tenth of a second. Relay 125, therefore, during the code generation period of the operational cycle is actuated four times with a pause, four times with a pause, and then three times, thereby causing tone transmitter 105 to send out on control channel A the code established by relay 25 through the connection of the input circuit of tone transmitter 105 through contacts 69a and 67b and contacts 70a and 70b of master relay 65 which are closed during the code generation cycle.

At the same time master relay 65 was operated, its contacts 68a and 68b closed to connect relay coil 85a to cam switch 151, which after one second of operation, closes the circuit actuating relay 85. If relay 95 had been operated at stand-by condition to indicate that the pump was running, it is kept operated during the control period by the ground provided via the closed contacts 86a and 86b of supervisory channel relay 85 although the connection of tone receiver 106 which actuated relay 95 was broken upon operation of relay 85 to open its contacts 91a and 91c. Accordingly, run indicating lamp 17 will continue to be illuminated in the event that the pump was running before operation was initiated.

*Operation-check code reception*

The code transmitted on control channel A is received at station A by tone receiver 407 causing a closure of contacts 407a and 407b in accordance with the code. If receiver 407 properly responds, its contacts 407a and 407b will close and reopen eleven times according to the check code 4–4–3–. Motor magnet control relay 275 will accordingly respond eleven times connecting ground through its contacts 276a and 276b to actuate motor magnet 260 and step wipers 250a and 255a eleven contacts 250b and 255b from home contacts 250c and 255c. Contacts 277a and 277b also operate wiper control relay 270, which being slow to release, will hold during each group of pulses of the code. As contacts 276a and 276b operate motor magnet 260 stepping wipers 250a and 255a the first four contacts off home position, the opening of contacts 271a and 271c prevents ground being placed on wiper 250a. At this point, during the half-second interval between code groups, wiper control relay 270 releases providing ground for wiper 250a to actuate first code group response relay 310 which locks up via its contact 312a and 312b and contacts 251a and 251b of the off normal switch associated with the control code receiver which closed as the wipers made their first step.

It will be noted that when wiper control relay 270 operated on the first pulse received, its contacts 272a and 272b closed to connect neutral A.C. to timer motor 432 which then started with its cam operated switch 435 locking motor 432 up for a control period of thirty seconds and also establishing the brake circuit for motor 420.

The second group of four pulses received will repeat the operations of stepping switch 250 to step wiper 250a and wiper 255a four additional positions, that is, stopping them on the eighth bank contacts 250b and 255b respectively. Ground is thus connected through contacts 311b and 311a of relay 310 which had previously closed to operate the second code group response relay 315 in a like manner. Relay 315 locks up via its contact 319a and 319b and contacts 312a and 312b of relay 310 to ground.

The last group in the check code provides three pulses which cause wipers 250a and 255a to take an additional three steps, stopping on the eleventh bank contacts 250b and 255b, respectively. Ground is then applied through contacts 318a and 318b of second code group response relay 315 which had previously closed, and the normally closed contacts 333a and 333c of check code group response relay 330 to actuate the latter which locks up upon closure of its contacts 333a and 333b for a period of ten seconds determined by cam operated switch 438.

At the same time, master correct code response relay 325 is actuated by the closure of contacts 332a and 332b of check code response relay 330. Master correct code response relay 325 thereupon locks through its contacts 328a and 328b for a period of twenty-six seconds under the control of cam operated switch 436.

*Operation-confirmation of check code*

The confirmation signal which denotes proper response to the check code is in the form of four pulses which are sent to control unit A over supervisory channel A. These pulses are generated by the closure of the code establishing circuits associated with first code group response relay 310 and second code group response relay 315 placing ground on the second and fourth bank contacts 415b of selector switch 415 and by the operation of master correct code response relay 325 placing ground on the sixth and eighth contacts 415b of switch 415.

At the end of the fifth second of the controlled unit sequence period, cam switch 437 operates to connect neutral A.C. shunting the brake circuit associated with motor 420 which operates switch 415. The motor then starts causing its associated off normal contacts to operate. Contacts 418a and 418b close to keep motor 420 running for four seconds and keep the brake circuit including rectifier 422 and resistor 421 shunted until contacts 418a and 418b again open. Since cam switch 437 is then disconnected, the opening of contacts 418a and 418b will be effective to restore the brake circuit and stop the motor 420.

The operation of off normal contacts 417a and 417c upon movement of wiper 415a from its home position at contact 415c is effective to break the supervisory circuit connection with motor run switch 460 by the opening of contacts 417a and 417c. The closure of contacts 417a and 417b, however, operates to transfer the supervisory circuit control to wiper 415a of switch 415. As wiper 415a scans the four grounded bank contacts 415b, tone transmitter 408 will thereupon be actuated four times to send four pulses to the tone receiver 106 located at control station A confirming the operation of the check function.

By reason of the control of the confirmation code generator by cam operated switch 437, the confirmation signal will be sent beginning with the fifth second of the control period. Again, as in the case of the control code generator, the confirmation code generator is a modified stepping switch, modified, that is, to the extent that the motor magnet is substituted by a fifteen r.p.m. motor 420. As in the case of the control code generator, stepping switch 415 is arranged actually to wipe successively forty contacts. Accordingly, the confirmation signal is sent out beginning with the fifth second of the control period as determined by cam operated switch 437 and the pulses, since only alternate bank contacts 415b are grounded, are at a rate of 5 per second.

Again, referring to control unit A, the four pulses sent by the confirmation code generator, if properly received at tone receiver 106, will cause contacts 107a and 107b to close four times, beginning at the fifth second of the control cycle.

The previous actuation of supervisory channel relay 85 was effective to switch the supervisory circuit via contacts 91a and 91b, contacts 84a and 84c and contacts 79a and 79c to the control of cam operated switch 152, which operates at the fourth second of the control period for a period of five seconds to connect the supervisory circuit to actuating coils 175a and 180a of relays 175 and 180, respectively, causing these to operate as the four code pulses are received. If controlled unit A responded properly, and the four pulses were properly received, the supervisory circuit will thus cause relay 180 to be actuated four times causing motor magnet 162 to step wiper 160a four times. At the same time, relay 175a which is a slow release relay, remained actuated during the period of four pulses preventing ground from being established on wiper 160a until after the fourth pulse and a pause allowing sufficient time for release of relay 175.

Upon the release of relay 175, ground is placed on wiper 160a which has stepped to its fourth bank contact 160b. Moreover, as the first pulse was received, the off normal contacts associated with stepping switch 160 were also actuated closing a potential ground through contacts 164a and 164b for locking confirmation code relays 190, 200, 205 and 210. As wiper control relay 175 releases after the fourth pulse, ground is placed on check code confirmation relay coil 200a to operate relay 200 which locks up on the potential ground from off normal contact 164a through its contacts 202a and 202b while its contacts 201a and 201b connect ground through contacts 87b and 87a of relay 85 to light check code confirmation lamp 16 confirming the check code function over-all response.

Lamp 16 stays lighted until confirmation code receiver switch 160 is returned to its home position with wiper 160a on contact 160c releasing relay 200 and thereby releasing the ground for the circuit energizing lamp 16.

In the meantime controlled unit A at the end of ten seconds of operation restores the control code receiver to stand-by condition. Thus, cam operated switch 438 is activated at the tenth second for a period of two seconds closing armature 438a and contact 438b and releasing contact 438c. The release of contact 438c from connection with armature 438a results in the release of check code response relay 330. The closure of armature 438a and contact 438b connects a ground from off normal contacts 251a and 251b to winding 265a of homing relay 265 which operates for two seconds. Contacts 266a and 266c open to remove ground from wiper 250a while contacts 268a and 268c open to deactivate the motor magnet control circuit. At the same time contacts 267a and 267b of homing relay 265 close to connect ground from contacts 252a and 252b of the off normal switch associated with the control code receiver to motor magnet coil 260a via its interrupter contacts 261a and 261c. The operation of motor magnet 260 thereupon causes wiper 250a and wiper 255a to step around to home position at contacts 250c and 255c. Thereupon, contacts 251a and 251b open to deenergize motor magnet 260 and to open the holding circuit for first and second code group response relays 310 and 315 which release.

At the same time, in control unit A, although code establishing relay 25 and master relay 65 had released at the end of the four second code control generator period, supervisory channel relay 85 remained operated via its contacts 90a and 90b to ground through closed armature 155a and contact 155c of cam operated switch 155. At the end of sixteen seconds of the control period, cam operated switch 153 operates to close armature 153a with contact 153b operating homing 170 relay in the confirmation code receiver. Contacts 173a and 173b connect ground from off normal contacts 165a and 165b to motor magnet coil 162a via its contacts 163a and 163c to home stepping switch 160. Upon reaching home position of wiper 160a at contact 160c, the opening of contacts 164a and 164b releases check code confirmation relay 200 extinguishing lamp 16. At the same time, homing relay opens its contacts 172a and 172c disabling the motor magnet control circuit. Contacts 171a and 171c of homing relay 170 are also opened opening the ground connection to wiper 160a to prevent spurious response as the wiper is stepped to home position.

At the end of twenty-six seconds during the controlled period, cam switch 436 of the controlled unit sequence timer operates for two seconds releasing master correct code response relay 325 and reoperating homing relay 265. Since wipers 250a and 255a had previously been homed at the end of the tenth second of the controlled period, stepping switch 250 is not affected.

At the end of twenty-eight seconds, cam operated switch 155 in the control unit sequence timer opens to release supervisory channel relay 85.

At the end of thirty seconds, cam operated switch 150 releases timer motor 147 to stop the motor and cam sequence, and relight lamp 22 signifying idle conditions. At the same time, cam operated switch 435 releases the controlled unit sequence timer motor 432 to stop the controlled unit sequence.

*Operation-start code generation*

Indication that a station is not running is provided by the lighting of lamp 19. Ground from contacts 98a and 98c of station condition indicating relay 95, which is released when the pump is not running, keeps lamp 19 lit.

Since the start button 11 is normally deactivated to prevent accidental operation, it must have one terminal grounded before its operation can affect operation of start code establishing relay 40 to set up the start code of 4–4–5. This code, it will be observed, is derived by adding two to the third digit of the check code 4–4–3. To activate start button 11, check button 10 is first activated for one second, as described above, to send the code 4–4–3 as explained. After one second cam switch 151 closes its armature 151a with contact 151b, thereby activating start button 11.

In order to transmit the start function, start button 11 is then momentarily pushed to operate start code establishing relay 40. At the same time, contact 151c and armature 151a are opened and held open for fourteen seconds by cam operated switch 151 to permit check code establishing relay to be released at the end of the four second control code generator cycle, even though contacts 41a and 41b are closed. In addition the closure of contacts 43a and 43b and contacts 44a and 44b connected to the twenty-second and twenty-third bank contacts 115b of control code generator switch 115 has no effect because switch 154 remains unoperated. When start code establishing relay 40 operates, it locks up via its contacts 42a and 42b, contacts 56a and 56c of relay 50, cancel switch 15 and cam switch 153 to ground.

At fourteen seconds after commencement of the check function cycle initiated by sending check code 4–4–3, and after controlled unit A has received such check code, sent a confirmation signal and the confirmation signal has been correctly received by control unit A, after the control code generator and control code receiver have homed, after the confirmation code generator and the confirmation code receiver have homed, and after lamp 16 has been lighted to indicate confirmation of the check code receipt, cam switch 154 closes its contacts 154b and armature 154a to ground code contacts 43a and 44a. At the fourteenth second switch 151 also operates to actuate check code establishing relay 25 and master control relay 65. The control code generator is thereby actuated and locks up as before for a four second cycle. The consequent operation of off normal contacts 117a and 117b locks up relays 25 and 65 holding relays 25 and 65 until off normal contacts 117a and 117b open at the end of the code generation cycle. It will be noted that cam switch 153 opens the ground on contacts 43a and 44a and holding relays 40 at sixteen seconds thus permitting the relays to release. Since only two and one-half seconds are required to send the control codes, the three-second interval (fourteenth, fifteenth and sixteenth seconds) is adequate for transmission of the control code.

Since contacts 43a and 44a of start code establishing relay 40 are closed with their associated contacts 43b and 44b by reason of the operation of start code establishing relay 40, ground is placed on the twenty-second and twenty-third bank contacts 115b of switch 115. Since check code relay 25 is also operated, the operation of wiper 115a will cause the transmission of the code 4–4–5 over control channel A. In other words, the two extra pulses which change the code from 4–4–3 to 4–4–5 are stored, as it were, by start code relay 40 and switch 154 until after the code 4–4–3 has been processed.

Proper response to the start code by controlled unit A tone receiver 407 will, as in the case of the check code, first cause relay 310 to lock up upon receipt of the first group of four pulses and then will cause relay 315 to lock up upon the recipt of the second four pulses. It will be noted that relay 325 was previously locked up and held by cam switch 436 and was not released when the other code responsive relays were released at the end of the transmission of the confirmation signal responsive to the check code.

The last code group of five pulses will cause wiper 250a to stop on the thirteenth bank contact 250b of switch 250. A ground is thus connected through contacts 317b and 317a of second code group responsive relay 315 and through contacts 327b and 327a of master correct code response relay 325 to operate start code response relay 340 which thereupon locks up with relay 325 to the same ground from cam switch 436. Contacts 342a and 342c are thereupon opened to prevent actuation of stop code response relay 350 should two spurious pulses occur after relay 340 operated. Contacts 341a and 341b also closed to operate check code response relay 330 which opens its contacts 331a and 331c to break the pulsing circuit to motor magnet control relay 275 and prevent further operation of stepping switch 250 if spurious pulses are received.

At twenty seconds, cam switch 440 closes to connect ground from off normal contacts 251a and 251b through contacts 345b and 345a of start code responsive relay 340 to the winding 400a of start relay 400. Contacts 401a and 401b thereupon close to connect neutral A.C. to operate auxiliary power control relay 450 associated with the pump motor start circuit which closes its contacts 451a and 451b to connect the ground on relay coil 400a also through contacts 344b and 344a to the tenth and twelfth bank contacts 415b of confirmation code generator switch 415.

Since the first code and second code group response relays and the master correct code response relays previously operated the bank will now have six grounded contacts 415b to establish the confirmation code for the start function, which code is transmitted at twenty-four seconds when cam switch 437 reoperates the confirmation code generator. At the same time (at twenty seconds) the motor start circuit is actuated by closure of contacts 452a and 452b to initiate a start condition for the pump unit.

The six pulses transmitted over supervisory circuit A again act upon relays 175 and 180 to step the confirmation code receiver. This time cam switch 152 closes the pulsing circuit to the motor magnet and wiper control relays 180 and 175 at the twenty-third through the twenty-ninth seconds of the control period, such that upon proper receipt of the six pulses wiper 160a is caused to take six steps off its home position at contact 160c whereupon start code confirmation relay 205 is operated locking up through contacts 164a and 164b of the off normal switch associated with the confirmation code generator.

The operation of relay 205 further causes its contacts 206a and 206b to close, connecting ground through contacts 88b and 88a and through winding 100a of permissive start indicating relay 100 causing the same to operate. Since the start function usually initiates a permissive start condition of the pump motor, the operation of relay 100 will cause permissive start lamp 18 to light and to remain lighted until later when start-up actually occurs. When permissive start indicating relay 100 operates it locks up via its contacts 102a and 102b, contacts 49c and 49a of stop code relay 45 and contacts 96c and 96a of station condition indicating relay 95 to ground. Contacts 101a and 101b of permissive start indicating relay 100 also operate to light lamp 18.

When actual start up is effected, run switch 460 in the switch gear associated with the pump will close supervisory circuit A, as before, to cause tone receiver contacts 107a and 107b to operate relay 95 opening the holding circuit for relay 100 thereby extinguishing permissive start 18 and lighting start lamp 17. At the same time, as before, contacts 98a and 98c open to extinguish the stop lamp 19.

At the end of the control cycle, all the circuits are restored to stand-by condition in the same manner as described with respect to the transmission of the check function where no secondary function was transmitted, with the exception, however, that permissive start indicating relay 100 will remain actuated until actual start up occurs if this did not occur prior to termination of the control sequence period.

*Operation-stop code generation*

To stop the pump motor or to cancel a permissive start status which may be in effect, check button 10 is operated and after one second the stop button is momentarily pushed. The overall action, as explained for initiating a start is the same, but with the following exceptions. This time, relay 45 for establishing the stop code will operate. The ground on its winding 45a will be extended through its contacts 46a and 46b to winding 40a of the start code establishing relay 40 causing it also to operate. Both these relays lock up together as did the start code relay when start was explained. The operation of both start and stop code relays will now cause an additional four grounds to be connected to bank contacts 115b of the control code generator. These four, added to the third group of the check code, will change the code to 4–4–7, the stop code. As previously explained with reference to the start function, the code is stored until after the check code 4–4–3 has been sent, received and confirmed.

If prior to initiation of the check function the controlled station was in a permissive start status, and accordingly relay 100 had been locked up via contacts 49a and 49c of stop code establishing relay 45 to ground on contacts 96a and 96c of relay 95, it will be noted that the locking circuit is broken on operation of relay 45 to release relay 100 and cancel the indication of permissive start. If relay 100 were not released in this manner, it would continue the indication of permissive start by lamp 18 after the permissive start status in the station had been cancelled by response to the stop code.

When the stop code 4–4–7 is correctly received at tone receiver 407, relays 310 and 315 will operate as before while master correct code response relay 325 remains locked up.

This time, the last code group will cause wiper 250a to stop on the fifteenth bank contact 250b. Since relay 325 was locked up by the check code, the grounded wiper 250a therefore connects through contacts 326b and 326a of relay 325 and the closed contacts 342c and 342a of start code response relay 340 to winding 350a of stop code responsive relay 350 to operate the same. Relay 350 locks up with the master correct code response relay 325 to the ground on contact 436c of controlled unit sequence timer cam switch 436. Contacts 351a and 351b extend the ground on winding 350a of relay 350 to operate check code response relay 330. Contacts 331a and 331c thereupon open to disable the pulsing circuit to motor magnet control relay 275 and prevent further action of wiper 250a.

At twenty seconds cam switch 440 connects ground through contacts 354b and 354a of relay 350 to operate the winding of stop relay 405 which thereupon connects neutral to operate auxiliary power relay 455 in the motor stop circuit associated with the pump, contacts 456a and 456b of which close to connect the ground from winding 405a of stop relay 405 through closed contacts 353a and 353b and through closed contacts 355b and 355a of relay 350 to the tenth, twelfth, fourteenth and sixteenth bank contacts 415b of the confirmation code generator. Thus, there are eight grounded bank contacts 415b to generate the confirmation code which subsequently is sent via supervisory circuit A to light lamp 19 at the control unit.

At the same time contacts 457a and 457b associated with the motor stop circuit close to effect a stop condition in the pump unit switch gear. Run switch 460 will thereupon open so that when the controlled unit times out it will open supervisory circuit A and allow relay 95 in the control unit A, which had dropped out at the twenty-eighth second, to remain unoperated. Lamp 17 will thereupon be extinguished and lamp 19 will remain lit to indicate stop. Final release of components at the end of the cycle will be effected as already explained.

*Operation—Additional function code generation*

Switches 13 and 14 are provided for telemetering purposes such as on demand meter totalizer counts or pressure readings. In the illustrated case, switch 13 has been utilized to connect equipment to supervisory channel A to permit reading of suction pressure at the pump, while switch 14 has been provided to permit reading of discharge pressure at the pump. When a reading of suction pressure or discharge pressure or other telemetering arrangement is required, the check may be made prior to initiating a command for a pressure reading to determine if the overall response to the system is in working order. However, this is usually not necessary since at all times irregularities in the communication channels which permanently or temporarily delay control will immediately provide an alarm to that effect. Since no ill effects will result from unintended or accidental operation of telemeter devices, it is not ordinarily necessary to have the check code precede the code for such functions as discharge and suction pressure readings. In addition, a longer period in the control cycle is provided for transmission and reception of information signals by avoiding transmission of the check code.

Accordingly, in the illustrated arrangement, switch buttons 13 and 14 have their common ground connections at contacts 13b and 14b activated along with the ground side (contact 10b) of check push button 10, under the control of the off normal contacts 117a and 117c associated with control code generator switch 115.

The selection code of 4–4–9 is established when pushbutton 13 is pushed and held for one-half second. The suction pressure code establishing relay 50 operates and transfers the ground on its winding 50a through its contacts 52a and 52b to operate stop code establishing relay 45 and likewise to operate start code establishing code relay 40. Closure of contacts 56a and 56b operates check code establishing relay 25 and master control code relay 65. The actuation of relays 25, 40, 45 and 50 thereupon establishes ground connections to bank contacts 115b of control code generator switch 115 since although cam operated switch 154 is arranged to ground the code establishing contacts associated with relays 40, 45, 50 and 57 only during the latter portion of the control cycle, contacts 53a and 53b shunt cam operated switch 154 and place ground on all the contacts 115b associated with relays 40, 45 and 50. Thus, relays 40, 45 and 50 add six grounds to the three established by check code relay 25 in the third digit of the control code. As before, master code relay 65, upon actuation, causes control code generator switch 115 to send the code 4–4–9 while off normal contacts 117a and 117b close providing ground to lock up the actuated code establishing relays during the period the code is sent by the control code generator. At the same time, control relay 65, as before, initiates the operation of control sequence timer motor 147.

If relay 100 had been previously operated to indicate a permissive start status, the opening of contacts 49a and 49c upon actuation of relay 50 and hence of relay 45 which would otherwise break the holding circuit for relay 100, is ineffective to do so, since relay 50 operates before relay 45 and its contacts 64a and 64b close before contacts 49a and 49c open. Since relays 45 and 50 have a common holding circuit and they release together, the initial holding circuit for relay 100 restores as the second opens and indication of permissive start is maintained.

The closure of contacts 51a and 51b of suction pressure code establishing relay, upon the actuation of such relay, also completes a circuit in conjunction with contacts 71a and 71b of master relay 65 and contacts 62a and 62c associated with discharge pressure code establishing relay 57 to place ground on winding 75a of suction pressure relay 75 which then locks up through its contacts 78a and 78b and cam switch 155 to ground. Contacts 76a and 76b place ground on the suction pressure read out jack terminal 108a, while contacts 79a and 79b operate to provide a circuit from open contact 91b of supervisory channel relay 85 via closed contacts 84a and 84c of discharge pressure relay 80 to open terminal 108b of the suction pressure read out jack 108.

Suction pressure read out jack 108 is, of course, connected externally to a suction pressure recorder of conventional description. If desired, the closure of ground upon contact 108a can also be utilized at that point to provide for switching the suction pressure recorder to its connection with jack 108 if the suction pressure recorder is desired to be used in common with the other control units. Since relay 85 does not operate to close the supervisory circuit through its contacts 91a and 91b until after the response by the controlled unit, the supervisory circuit will have been opened and remain unconnected to the pressure recorder such that the pressure recorder responds only to the pressure signal which subsequently arrives from pressure sending device 465 located at the controlled unit.

When the code for suction pressure reading 4–4–9 is properly received at tone receiver 407 in controlled unit A to actuate stepping switch 250, relays 310 and 315 respond to the first two code groups as previously explained. The third code group causes wiper 250a to stop on the seventeenth bank contact 250b of switch 250. Ground is thus connected directly to the winding on relay 360 which operates and locks up to the ground on cam switch 436 until the latter releases at twenty-six seconds. Contacts 361a and 361c of suction pressure code responsive relay 360 break the circuit for actuating long pulse detector relay 370 to prevent its operation because of possible false pulsing that may occur in the control circuit while telemetering signals are being transmitted.

When relay 360 operates, its contacts 364a, 364b and 364c switch the supervisory circuit from run switch 460 in the switch gear to switch 468 in suction pressure telemetering device 465, while its contacts 363a and 363b close to energize motor 466 of pressure transmitter 465. Closed switch 468 closes the supervisory circuit at that point until cam 467 again opens switch 468.

It will also be noted that as control code receiver 250 was initiated into operation by receipt of the first pulse of the first code group of the suction pressure code, the opening of off normal contacts 251a and 251c associated with the receiver 250 opens the supervisory circuit through switch 460, such that the operation of suction pressure code responsive relay 360 to switch the supervisory circuit to switch 467 associated with suction pressure transmitter 465 closes the supervisory circuit for a period of time measured by the pressure at the intake of the pump. No interference with such closure of the supervisory circuit occurs when the confirmation code generator operates at the fifth through the ninth seconds of the controlled sequence since the normal connection of the confirmation code generator in the supervisory circuit is broken by the opening of relay contacts 364a and 364c.

At control unit A, it will be recalled, that the supervisory circuit at the end of the first second of the control sequence is connected by actuation of relay 85 under the control of cam switch 151 connecting tone receiver contact 107b to suction pressure read-out jack terminal 108b through the contacts 79a and 79b associated with suction pressure relay 75 which had previously closed. Since at least a pulse of the control code had already been sent, prior to actuation of relay 85, controlled unit A will have responded to at least a pulse of the control code, opening the supervisory circuit before relay 85 operates to connect the supervisory circuit through its contacts 91a and 91b to the pressure recorder at jack 108. Thus, the recorder receives a closed supervisory circuit signal exactly equal to the period of time that switch 468 of suction pressure transmitter 465 remains closed after actuation of suction pressure code response relay 360.

After switch 468 opens the normal release of the components under control of the control unit sequence timer and controlled unit sequence timer occurs as described before with relay 75 releasing under the control of cam operated switch 155 and relay 360 releasing under the control of cam operated switch 436.

Switch 14, as noted above, is utilized to connect equipment to supervisory channel A to permit reading of discharge pressure at the pump, and, as in the case with recording suction pressure, the check function can be omitted. Discharge pressure is simply read by connecting the recorder to control unit A at jack 109. The function is initiated by depressing push button switch 14 for a half-second to actuate relay 57 thereby operating the remaining code establishing relays 50, 45, 40 and 25 along with master relay 65 to ground bank contacts 115b of the control code generator establishing the code 4-4-11 and initiating operation of the control code generator and control unit sequence timer, as before, transmitting the thereby established code on control channel A.

Discharge pressure control relay 80 also operates through the closure of contacts 58a and 58b. At the same time, contacts 62a and 62c open, breaking the energizing circuit for suction pressure control relay 75.

Relay 80 locks up on its contacts 83a and 83b to ground at cam operated switch 155. Contacts 81a and 81b close to make a ground connection at terminal 109a of jack 109, and contacts 82a and 82b close to connect ground to lamp 21 which lights indicating that discharge pressure is being read. Contacts 84a and 84c open breaking the supervisory circuit connection from contact 91b of supervisory channel control relay 85 to contact 79a of suction pressure relay 75 and connecting the supervisory circuit at contact 91b to terminal 109b of jack 109 through the closure of contact 84a with contact 84b.

As before the operation of master control relay 65 operates relay 85 to shift the supervisory circuit connection to contact 91b.

At controlled unit A the response of the control code receiver to the discharge pressure control code 4-4-11 steps wiper 250a off home at contact 250c to the nineteeth contact 250b operating discharge pressure code response relay 365 after relays 310 and 315 have operated in the ordinary course upon the receipt of the first two code groups. The actuation of relay 365 closes its contacts 367a and 367b locking relay 365 at ground on cam operated switch 436. The opening of contacts 366a and 366c breaks the control circuit connection to long pulse detector relay 370, while the opening of contacts 369a and 369c breaks the supervisory circuit connection to off normal contacts 417 of the confirmation code generator. At the same time, contacts 369a and 369b close connecting discharge pressure transmitter switch 473 across the input of tone transmitter 408. Similarly, contacts 368a and 368b close to energize discharge pressure transmitter motor 471 to drive cam 472 to the point where it breaks the connection of normally closed switch 473 determined by the discharge pressure. As in the case of reading suction pressure the recorder at jack 109 thus receives a closed supervisory circuit signal having the same length as the time from actuation of motor 471 to the opening of switch 473. As before the system remains actuated and the components are released in normal order under the control of the control unit sequence timer and the controlled unit sequence timer, relay 80 being released under the control of cam operated switch 155 and relay 365 being released under the control of cam operated switch 436.

In many circumstances, the time required to record the suction pressure and discharge pressure readings at the pump is relatively short compared to the control cycle of thirty seconds and is therefore desirable to enable both readings to be taken in a single cycle. This is accomplished by depressing push button 13 to initiate the suction pressure reading as before. If the reading is completed with sufficient time left in the cycle to take the other reading, and prior to the second period of operation of the control code generator at the fourteenth second of the control cycle, depression of push button 14 will cause transmission of the discharge pressure control code beginning at the fourteenth second of the control unit sequence.

Although relay 360 is actuated at the time of the reception of the code 4-4-9 at the control code receiver calling for a suction pressure reading, the connection at the nineteenth bank contact 250b of wiper 250a will actuate discharge pressure code response relay 365 which, as pointed out before, breaks the supervisory circuit connection to suction pressure transmitter 465 and connects this to discharge pressure transmitter 470 to transmit the discharge pressure information as before. It will be noted that in control unit A the depression of button 14 connected the discharge pressure recorder to the supervisory circuit at jack 109. Thus, the discharge pressure reading is obtained. When the sequence timers time out, the equipment releases as before.

It will be observed that any interruption to or irregularities in telemetering information signals of the time duration type employed by pressure transmitters 465 and 470 cannot be prevented if the supervisory circuit or channel is affected by faulty operation and would provide a faulty reading at the recorder located at jack 108 or jack 109, as the case may be. It will be noted that long pulse detector relay 370 ordinarily would detect an improper control channel or circuit signal of two-tenths of a second or longer and break the supervisory circuit placing cam operated switch 439 across the input of tone transmitter 408 to cause a flashing signal at the control unit. Relay 370 is accordingly deactivated during periods of recording pressure information by the opening of its actuating circuit at contacts 361a and 361c in the case of suction pressure recording and of contacts 366a and 366c in the case of discharge pressure recording.

It will be further noted that during the thirty second operational cycle, the confirmation code generator is operated once beginning at the fifth second and again beginning at the twenty-fourth second under the control of cam operated switch 437. During suction and discharge pressure recording, however, the confirmation code generator does not send any code which may exist on its bank contacts since the supervisory circuit is seized by either relay 360 or relay 365, as the case may be.

*False operation during stand-by*

It will be apparent that despite the precautions taken to prevent the same, spurious signals can occur in both the control and supervisory channels. These, as a general rule, may take the form of a single pulse, either short or long in duration, or the form of a series of pulses.

A single pulse of short duration on the control channel will obviously step wiper 250a off its home position at contact 250c to the first bank contact 250b, since the control code receiver during stand-by condition is connected to receive any signal on the control channel. As wiper 250a stops on the first bank contact 250b an energizing circuit for fault detector and lock out relay 300 is completed actuating the relay which locks up on its contacts 304a and 304b to ground on cam operated switch 436. The operation of relay 300 immediately breaks the connection of the control circuit to motor magnet control relay 275, since contacts 301a and 301c are thereupon opened preventing any further action of the control code receiver which is locked out. As before, however, the stepping off home position of wiper 250a actuated the controlled unit sequence timer. Accordingly, relay 300 remains operated for twenty-six seconds when its ground connection on cam operated switch 436 is broken.

The opening of contacts 306a and 306c deactivates the potential ground connection through contacts 329a and 329b of correct code response relay 325 to the sixth and eighth bank contacts 415b of the confirmation code generator, while the closure of contacts 306a and 306b and of contacts 305b and 305a places ground on the second and fourth bank contacts 415b establishing a two-pulse alarm code on bank contacts 415b. Contacts 302a and 302b are also actuated to connect ground from cam operated switch 436 to the control circuit providing a signal of sufficient duration to operate long pulse detector relay 370. In addition, contacts 303a and 303b close to connect neutral A.C. to timer motor 432. It will be noted that actuation of timer motor 432 normally is caused by the actuation of wiper control relay 270. The other connection through contacts 303a and 303b is provided in the event that a single short pulse which would step the control code receiver might be of insufficient duration to actuate relay 270 for a sufficient length of time (one second) to lock timer motor 242 up on cam operated switch 435.

The actuation of relay 370 through the opening of its contacts 372a and 372c breaks the supervisory circuit connection to the confirmation code generator and through the closure of its contacts 372a and 372b connects the supervisory circuit, that is, the input to tone transmitter 408, to cam operated switch 439 which makes and breaks the circuit periodically, thereby operating tone transmitter 408 accordingly. The periodic operation of tone transmitter 408 continues until release of relays 300 and 370 at twenty-six seconds upon the opening of their holding circuit at cam operated switch 436. At the control unit, relay 95 responds to the periodic signal from cam operated switch 439 causing lamps 17 and 19 to flash alternately, providing a visual alarm of the fault condition.

Upon release of relays 300 and 370 at the twenty-sixth second the equipment restores to normal condition under the control of the controlled sequence timer as the latter times out.

It will be apparent that, although relay 370 is a slow to operate relay and will not respond to normal control pulses at the rate of ten per second a spurious long pulse of two-tenths of a second duration or more will actuate relay 370. Since motor magnet 260 also is operated to step wiper 250a off home at contacts 250c, the result is the same in the event of a long, spurious pulse as in the case of a short pulse except that where the spurious pulse is of indefinite duration relay 270 will not release to operate fault detector and lock out relay 300. Accordingly, contacts 371a and 371b of long pulse detector relay 370 provide an actuating circuit for relay 300 to connect the latter relay to ground on cam operated switch 436. The controlled unit sequence timer is thereby actuated through the closure of contacts 303a and 303b producing the alternate flashing alarm of lamps 17 and 19 at the control unit.

It will be noted that in connection with flashing alarms produced by cam operated switch 439 in the situation where permissive start indicating relay 100 is actuated and lamp 18 is lighted to indicate a permissive start condition, the first flashing pulse transmitted on supervisory channel A will momentarily operate relay 95, releasing the holding circuit for relay 100 cancelling the indication on lamp 18. Under such conditions, when the alarm cycle is completed the check and start function should be transmitted to obtain the necessary confirmation signal to operate relay 100 and relight lamp 18. Such transmission of the function requirement will not affect the pump controls since they will already be set for the start condition. Alternately, relay 100 can be modified to release slower than relay 95 and avoid the necessity of repeating the start function.

In the event that the spurious signal on the control channel takes the form of a series of pulses, it will be noted that, unless the series takes the form of the proper code groups which would be unlikely, either the stepping of wiper 250a of the control code generator stops in contact with a bank contact 250b connected, as discussed later, to actuate relay 300, or the series of spurious pulses continues, holding relay 270 and preventing ground from being placed on a contact 250b. In the latter event the ninth and tenth bank contacts 255b associated with grounded wiper arm 255a, which is ganged with wiper 250a, are connected to energize fault detector and lock out relay 300 through a circuit including normally closed contacts 316a and 316c of the second code group response relay which open only after proper receipt of the first two code groups. Accordingly, the actuation of relay 300 as before causes operation of the controlled unit sequence timer and of long pulse detector relay 370 to produce the alternate flashing light alarm at the control unit. In this manner, alarm is initiated within one second of the beginning of the series of rapid pulses providing early detection and prevention of excessive operation of the components.

Just as false pulses can occur in the control channel, so they may also occur on the supervisory channel. Any interruption in the supervisory channel which will change its status from open to closed or closed to open, depending on whether the pump is running or not, will have an effect on either relay 95 or relay 100. Thus, if relay 100 is locked up under the control of relay 95 to light lamp 18 indicating a permissive start condition, an interruption in the supervisory channel will cause relay 95 to operate releasing relay 100 extinguishing lamp 18. Lamp 17 would then be lighted falsely indicating a start and then releasing to light lamp 19 as the interruption in the supervisory channel ceased. Permissive start lamp 18, after the interruption in the supervisory channel is re-lighted by initiating the start code to obtain the confirmation signal necessary to reactuate relay 100 and light lamp 18. In the meantime, however, the pump motor could have started subject to proper hydraulic conditions. In this case, when the control cycle ends, relay 95 will operate releasing relay 100 and lamp 18 while at the same time lighting lamp 17 giving a proper indication of start.

*False operation during control period*

Spurious signals can also occur during periods of control interfering with proper transmission and reception of control and confirmation codes. To avoid interference with control codes, it will be noted that all bank contacts 250b which are not employed for initiating check or control functions, that is, the first, second, third, fifth, sixth, ninth, tenth, twelfth, fourteenth, sixteenth, eighteenth and twentieth bank contacts 250b, are commonly strapped together and connected to actuating coil 300a of relay 300. Thus, a spurious pulse during the transmission of a control code resulting, for example, in a group of five pulses in the first digit of the control code will cause wiper 250a upon release of wiper control relay 270 to energize fault detector relay 300. Similarly, a long pulse occurring during a control period will operate relay 370 again actuating fault detector and lock out relay 300.

The alarm signal produced in either event is the same as produced during idle periods under stand-by condition with the exception that during the operational cycle relay 85 is locked up from one to twenty-eight seconds on cam switch 155 connecting the supervisory circuit through its contacts 91a and 91b to cam operated switch 152 which, after four seconds, connect the supervisory circuit for a period of five seconds to operate relays 175 and 180 in the confirmation code receiver. Since the operation of relays 300 and 370 in the controlled unit initiated a flashing signal on the supervisory channel at a rate of one pulse every two seconds the closure of cam switch 152 in the control unit for a period of five seconds will cause wiper 160a to step to only three of the two second pulses. The first pulse to arrive will cause wiper 160a to stop on the first bank contact 160b for a period of time sufficient for relay 175 to release and energize bell 185. The next pulse will accordingly operate relay 190 initiating buzzer 191 which continues to buzz since relay 190 locks up on off normal contacts 164a and 164b. The third pulse to arrive causes wiper 160a to again ring bell 185. At the end of the eighth second, cam switch 152 opens to stop further stepping of the confirmation code receiver which remains operated with the buzzer and bell continuing to sound, alarming the occurrence of the false control channel signal.

The buzzer and bell continue to operate until cam switch 153 closes its contacts 153a and 153b at the sixteenth to seventeenth second of the operational cycle to home the control receiver which stops the buzzer and alarm bell.

At the twenty-third second of the operational cycle, the operation of cam operated switch 152 again closes the supervisory circuit to operate the confirmation code receiver which this time responds to only two of the two-second flasher pulses since relays 300 and 370 in the controlled unit are released at the twenty-sixth second by cam operated switch 436. The two pulses arriving again ring the bell and operate the buzzer. If the difficulty during transmission of the control function was temporary, a second transmission of the control function can be made after time out and proper confirmation will indicate the difficulty was only temporary. A repeated alarm will, of course, indicate the contrary.

As in the case during idle periods, interruption in the supervisory channel during periods of confirmation signals can interfere with proper confirmation of the transmitted function. For this reason, the bank contacts 160b not utilized to initiate confirmation of check, start or stop functions are tied together to energize alarm bell 185.

Since any interruption with a proper confirmation signal will cause switch 160 to step beyond the second contact 160b, the ringing of the alarm bell coupled with the failure of the buzzer will indicate that the interference is on the supervisory channel only and that the control channel is still clear for transmission of proper control functions.

It is also possible during operation that faulty response to control functions can occur at the controlled unit, or that the control code generator may falsely transmit a control code. In these circumstances, the sequential actuation of relays 310, 315 and 325 and possibly also of relays 340 and 350 required to set up a proper confirmation code will be interfered with. Thus, if the first code group is short a pulse, relay 310 will not operate but alternatively fault detector relay 300 will be actuated, producing, as in the case of a spurious signal during the control function transmission, a lock out of the equipment and an alarm. If, however, relay 310 properly operates, or if relays 310 and 315 operate, only the second and fourth bank contacts of the confirmation code generator will be grounded, which will result in a two-pulse alarm signal ringing buzzer 191 during the period of the transmission of the confirmation code indicating the faulty operation of the controlled unit.

If relay 370 fails to respond to a long control pulse to cause flashing signal, then at the tenth second, homing relay 265 will operate to home wipers 250a and 255a. As wiper 255a passes the ninth and tenth bank contacts 255b to operate relay 300 for lock out and alarm which is sent at the twenty-fourth second as two pulses on the supervisory channel by reason of the closure of contacts 305a and 305b, and contacts 306a and 306b.

*Miscellaneous*

Since faulty operation can occur through human error also, for example, by depression of the wrong start or stop button, the circuits holding code establishing relays 40 and 45 for transmission of such functions are wired through normally closed push button switch 15. The falsely initiated control function can thus effectively be cancelled up to the fourteenth second, when control code generator operates again, by depressing cancel push button 15 releasing relay 40 or relays 40 and 45. It will also be apparent that in the event of a mistakenly actuated push button 11 or 12, not only can the inappropriate code establishing relays be deactivated through the agency of push button 15, but, if prior to the fourteenth second, a proper function can be initiated by depressing the appropriate push button.

The controlled unit can be tested locally by inserting an open circuit plug and telephone dial switch into test jack 445. With the switch gear control circuits associated with the pump deactivated or disconnected, the proper codes can be dialed to permit visual component response.

In addition, both local and remote testing of the control and supervisory channels can be accomplished utilizing the code 4–3 which can be inserted into the control channel at the control station by patching into the lines or which can be introduced at the control circuit at jack 445. The purpose of the code 4–3 is to operate relay 310 and then relay 375, of which the actuating coil 375a is grounded through the seventh bank contact 250b. Relay 375 through its contacts 376a and 376b operates loop test timer motor 409a which can be pre-set for any predetermined period of time, preferably at least a minute. Contacts 410a and 410b close to lock up relay 375 through its contacts 377a and 377b for the duration of operation of timer 409. Loop test relay contacts 378a and 378c open breaking the supervisory circuit connection to tone transmitter 408; contacts 379a and 379c open breaking the control circuit connection from tone receiver 407; while contacts 378a and 378b and contacts 379a and 379b close, connecting the input of transmitter 408 across the output of tone receiver 407. With the line circuits thus connected back to back, a test loop is provided for test signals which are sent and received at the control station.

It will be noted that a group of seven pulses in the control channel will also operate relay 375. However, if relay 375 failed to operate no signal will be provided to indicate that the signal had been received. Thus, by dialing the combination of four pulses and three pulses, the operation of relay 310 will cause the transmission of two fault indicating pulses on the supervisory circuit should relay 375 fail to operate.

While the preceding description of the operation of the supervisory control system of my invention has been specifically with reference to a single control unit and single controlled unit, as suggested above in the general description it is contemplated to employ more than one such control arrangement utilizing a common control code generator, a common control sequence timer and a common confirmation code receiver. As indicated in the drawings, additional control units will be coupled with these three components in exactly the same manner as control unit A described with reference to FIGURES 3 and 4 with the same connections as shown to the control code generator, control unit sequence timer and confirmation code receiver. Since separate communication channels are normally contemplated, each additional control unit will require additional communication facilities for the control and supervisory channels and of course an additional controlled unit would be required at each controlled station.

Since initiation of any control code transmission deactivates push buttons 10, 13 and 14 upon the opening of off normal contacts 117a and 117c, the actuation of one control unit thus deactivates the remaining ones, preventing transmission of a control code on any except the selected control channel.

While it is not preferred, it is also possible to employ common control channels for the various units by choosing different control codes for the various units or by using multiplex circuitry.

Figure 14:
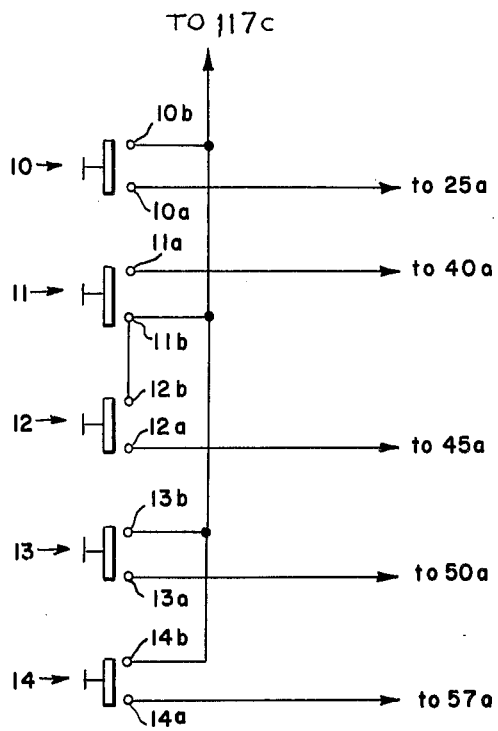
FIGURE 14 is a schematic diagram of a modification of control unit A for different control operation.

It is also feasible to utilize the supervisory control system of my invention in which each control unit is provided with its own control sequence timer, control code generator and confirmation code receiver, thereby permitting the control of more than one pump at a time. There are two advantages in favor of this manner of control, as opposed to the utilization of common time, generator and receiver for the various control units. One advantage is that several stations or pumps can be shut down at the same time rather than at thirty-second intervals. The other advantage is that through the elimination of common control devices the failure of one would affect only control of one station or pump. In such an arrangement without the provision of common control devices the two-button control system utilized above should still be used where a guard against accidental start or stop is considered important. In other circumstances, however, the system of my invention can be converted to a single-button control permitting initiation of a stop or start function to initiate the control function. In order to accomplish this, a relatively simple modification of the control unit can be made, as suggested in FIGURE 14, by disconnecting terminals 11b and 12b of start and stop push buttons 11 and 12, respectively, from their connection to cam operated switch contact 151b and instead connecting these terminals to off normal contact 117c along with push buttons 10b, 13b and 14b.

As suggested above, it is preferable that the relays and other operating components at the control station and controlled station of the system be types normally employed in commercial dial telephony practice to assure long operating life with a minimum of breakdown and maintenance. In keeping with such practice conventional safeguards against malfunction should not be overlooked. For example, spark suppressors across contacts 126a and 126b will materially prolong their life and improve signal quality. In addition, resistors can be employed in series in the holding circuit of relay 100 and in series in the actuating circuit of relay 95 to minimize danger of burn out during prolonged operation of such components, as suggested in FIGURE 4.

Figure 5:
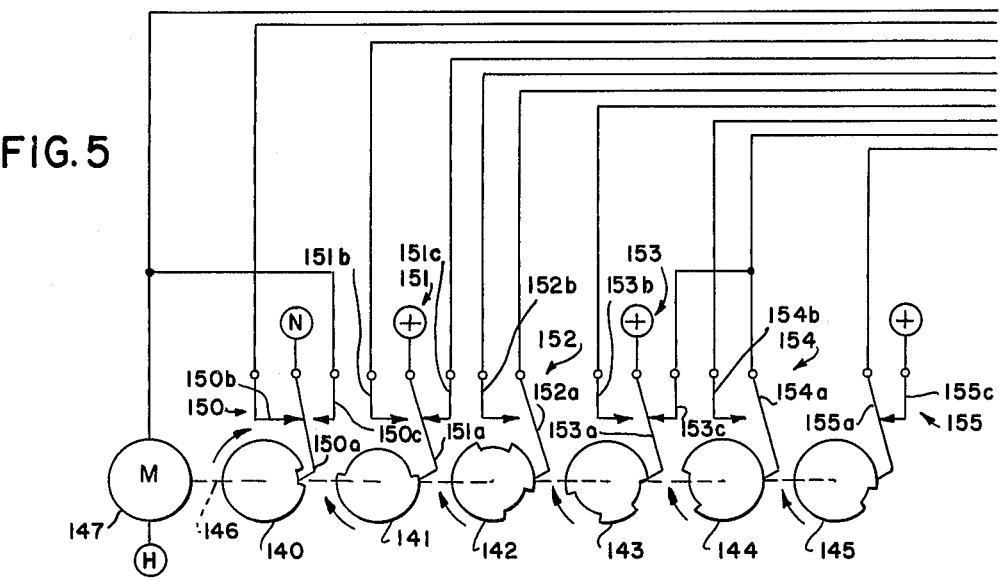
FIGURE 5 is a schematic diagram of the control sequence timer unit shown in FIGURE 1.

Reference to FIGURES 12 and 13 is briefly made as an air in clarifying the interconnections between the various figures and sheets of drawings. It should also be noted brackets are utilized in FIGURES 3 and 4 to indicate appropriate connections to other control units similar to control unit A in FIGURES 3 and 4 in order that each such control unit will be similarly connected to the control code generator (FIGURE 2), the control code receiver (FIGURE 6) and the control sequence timer (FIGURE 5).

I claim:
1. In a supervisory control system including a control unit, a controlled unit, a control communication channel, and a supervisory communication channel; the improvement which includes; a control code generator operable when actuated to generate a plural digit code, a control code receiver located at said controlled unit, a confirmation code generator located at said controlled unit, a confirmation code receiver, a first code establishing device located at said control unit operably connected to said control code generator and actuatable to condition said control code generator to generate a predetermined plural digit code, independent actuating means located at said control unit for simultaneously actuating said control code generator and said first code establishing device thereby to initiate generation of said predetermined plural digit code, said control code generator being connected to said control communication channel to transmit a code generated by said control code generator on said control communication channel, said control code receiver also being connected to said control communication channel to receive a code generated by a said control code generator and transmitted on said control communication channel, a first code digit responsive device located at said controlled unit connected to said control code receiver to be actuated thereby upon receipt of the first digit of said predetermined plural digit code at said control code receiver, a second code digit responsive device located at said controlled unit, means associated with said first code digit responsive device to be actuated thereby upon actuation thereof to connect said second code digit responsive device to said control code receiver to be actuated thereby upon receipt by said control code receiver of a subsequent digit of said predetermined plural digit code, means connected to said confirmation code generator and associated with said first and second code digit responsive devices to be actuated thereby upon actuation of both to condition said confirmation code generator to generate a confirmation code, means automatically actuated after the reception of said predetermined plural digit code to initiate operation of said confirmation code generator, said confirmation code generator and said confirmation code receiver being connected to said supervisory communication channel thereby communicating said confirmation code generator and confirmation code receiver whereby the code generated by said confirmation code generator is transmitted on said supervisory communication channel and received by said confirmation code receiver, and indicating means located at said control unit and connected to said control confirmation code receiver to be actuated thereby upon receipt by said confirmation code receiver of said confirmation code.

2. In a supervisory control system including a control unit, a controlled unit, a control communication channel, and a supervisory communication channel; the improvement which includes; a control code generator operable when actuated to generate a plural digit code, a control code receiver located at said controlled unit, a confirmation code generator located at said controlled unit, a confirmation code receiver, a first code establishing device located at said control unit connected to said control code generator and actuatable to condition said control code generator to generate a first predetermined plural digit code, a second code establishing device located at said control unit connected to said control code generator and actuatable to condition said control code generator in conjunction with said first code establishing device to generate a second predetermined plural digit code having the same initial digit as and a subsequent digit differing from that of said first predetermined plural digit code, primary independent actuating means located at said control unit for simultaneously actuating said control code generator and said first code establishing device thereby to initiate generation of said first predetermined plural digit code, said control code generator being connected to said control communication channel to transmit a code generated by said control code generator on said control communication channel, said control code receiver also being connected to said control communication channel to receive a code generated by a said control code generator and transmitted on said control communication channel, a first code digit responsive device located at said controlled unit connected to said control code receiver to be actuated thereby upon receipt of said first digit of said first and second predetermined plural digit codes at said control code receiver, a second code digit responsive device located at said controlled unit, means associated with said first code digit responsive device actuated thereby upon actuation thereof to connect said second code digit responsive device to said control code receiver to be actuated thereby upon receipt by said control code receiver of said subsequent digit of said first predetermined plural digit code, means connected to said confirmation code generator and associated with said first and second code digit responsive devices to be actuated thereby upon actuation of both to condition said confirmation code generator to generate a first confirmation code, means automatically actuated after the reception of said first predetermined plural digit code to initiate operation of said confirmation code generator, said confirmation code generator and said confirmation code receiver being connected to said supervisory communication channel thereby communicating said confirmation code generator and confirmation code receiver whereby the code generated by said confirmation code generator is transmitted on said supervisory communication channel and received by said confirmation code receiver, indicating means located at said control unit and connected to said control confirmation code receiver to be actuated thereby upon receipt by said confirmation code receiver of said first confirmation code, secondary independent actuating means located at said control unit for simultaneously actuating said control code generator, said first code establishing device and said second code establishing device thereby to generate and transmit said second predetermined plural digit code on said control code communication channel, means associated with said second code digit responsive device to be actuated thereby upon actuation thereof and holding said second code digit responsive device actuated, a third code digit responsive device located at said controlled unit, means associated with said first code digit responsive device to be actuated thereby upon actuation thereof, said last named means associated with said first code digit responsive device and said last named means associated with said second code digit responsive device being operable upon actuation of both to connect said third code digit responsive device to said control code receiver to actuate said third code digit responsive device upon receipt by said control code receiver of said subsequent digit of said second predetermined plural digit code, means connected to said confirmation code generator and associated with said first, second and third code digit responsive devices to be actuated thereby upon actuation of all three to condition said confirmation code generator to generate a second confirmation code, said automatically actuated means being automatically actuated a second time after the time for reception of said second predetermined plural digit code, second indicating means located at said control unit and connected to said confirmation code receiver to be actuated thereby upon receipt of said second confirmation code by said confirmation code receiver, and means located at said controlled unit associated with said third code digit responsive device to be actuated thereby upon actuation thereof for performing control functions at said controlled unit.

3. The improvement according to claim 2 which further includes means operably connected to control actuation of said control code generator, said first code establishing device and said second code establishing device by said secondary independent actuating means and associated with said primary independent actuating means to be actuated thereby after actuation thereof to delay the simultaneous actuation of said control code generator, said first code establishing device and said second code establishing device by said secondary independent actuating means upon actuation thereof to a time following actuation of said primary actuating means after the time for reception of said first confirmation code.

4. In a supervisory control system including a control unit, a controlled unit, a control communication channel, and a supervisory communication channel; the improvement which includes; a control code generator operable when actuated to generate a plural digit code, a control code receiver located at said controlled unit, a confirmation code generator located at said controlled unit, a confirmation code receiver, a control sequence timer, a controlled sequence timer located at said controlled unit, a first code establishing device located at said control unit connected to said control code receiver and actuatable to condition said control code generator to generate a first predetermined plural digit code, a second code establishing device located at said control unit connected to said control code generator and actuatable to condition said control code generator in conjunction with said first code establishing device to generate a second predetermined plural digit code having the same initial digit as and a subsequent digit differing from that of said first predetermined plural digit code, primary independent actuating means located at said control unit for simultaneously actuating said control code generator, said first code establishing device and said control sequence timer thereby to initiate generation of said first predetermined plural digit code and to initiate operation of said control sequence timer for a predetermined length of time, said control code generator being connected to said control communication channel to transmit a code generated by said control code generator on said control communication channel, said control code receiver also being connected to said control communication channel to receive a code generated by said control code generator and transmitted on said control communication channel, a first code digit responsive device located at said controlled unit connected to said control code receiver to be actuated thereby upon receipt of said first digit of said first and second predetermined plural digit codes at said control code receiver, a second code digit responsive device located at said controlled unit, means associated with said first code digit responsive device actuated thereby upon actuation thereof to connect said second code digit responsive device to said control code receiver to be actuated thereby upon receipt by said control code receiver of said subsequent digit of said first predetermined plural digit code, said controlled sequence timer having actuating means therefor connected to said control code receiver operable to actuate said controlled sequence timer for the same length of time as said control sequence timer in response to and at the moment of the initial receipt by said control code receiver of any signal on said control communication channel, means connected to said confirmation code generator and associated with said first and second code digit responsive devices to be actuated thereby upon actuation of both to condition said confirmation code generator to generate a first confirmation code, means associated with said controlled sequence timer actuated thereby after the time for reception of said first predetermined plural digit code to initiate operation of said confirmation code generator and to connect said confirmation code generator to said supervisory communication channel to transmit a confirmation code generated by said confirmation code generator on said supervisory communication channel, means associated with said control sequence timer actuated thereby after the time for transmission of said first predetermined plural digit code to connect said confirmation code receiver to said supervisory communication channel thereby communicating said confirmation code generator and confirmation code receiver, indicating means located at said control unit and connected to said confirmation code receiver to be actuated thereby upon receipt by said confirmation code receiver of said first confirmation code, secondary independent actuating means located at said control unit, means associated with said control sequence timer actuated thereby after the time for reception of said first confirmation code operable in conjunction with said secondary actuating means to actuate said control code generator, said first code establishing device and said second code establishing device thereby to generate and transmit said second predetermined plural digit code on said control communication channel, means associated with said second code digit responsive device to be actuated thereby upon actuation thereof, means associated with said controlled sequence timer actuated thereby during the time for reception of said first plural digit code until after reception of said second plural digit code to hold said second code digit responsive device actuated, a third code digit responsive device located at said controlled unit, means associated with said first code digit responsive device to be actuated thereby upon actuation thereof, said last named means associated with said first code digit responsive device and said last named means associated with said second code digit responsive device being operable upon actuation of both to connect said third code digit responsive device to said control code receiver to actuate said third code digit responsive device upon receipt by said control code receiver of said subsequent digit of said second predetermined plural digit code, means connected to said confirmation code generator and associated with said first, second and third code digit responsive devices to be actuated thereby upon actuation of all three to condition said confirmation code generator to generate a second confirmation code, said means associated with said controlled sequence timer for connecting said confirmation code generator to said supervisory communication channel being actuated a second time by said controlled sequence timer after the time for reception of said second predetermined plural digit code, said means associated with said control sequence timer for connecting said confirmation code receiver to said supervisory communication channel being actuated a second time by said control sequence timer after the time for transmission of said second plural digit code, whereby said confirmation code generator and confirmation code receiver are commonly connected to said supervisory communication channel a second time following transmission and reception of said second predetermined plural digit code, second indicating means located at said control unit and connected to said confirmation code receiver to be actuated thereby upon receipt of said second confirmation code by said confirmation code receiver, and means located at said controlled unit associated with said third code digit responsive device to be actuated thereby upon actuation thereof for performing control functions at said controlled unit.

5. In a supervisory control system including a control unit, a controlled unit, a control communication channel, and a supervisory communication channel; the improvement which includes; a control code generator operable when actuated to generate a plural digit code, a control code receiver located at said controlled unit, a confirmation code generator located at said controlled unit, a confirmation code receiver, a control sequence timer, a controlled sequence timer located at said controlled unit, a first code establishing device located at said control unit connected to said control code receiver and actuatable to condition said control code generator to generate a first predetermined plural digit code, a second code establishing device located at said control unit connected to said control code generator and actuatable to condition said control code generator in conjunction with said first code establishing device to generate a second predetemined plural digit code having the same initial digit as and a subsequent digit differing from that of said first predetermined plural digit code, primary independent actuating means located at said control unit for simultaneously actuating said control code generator, said first code establishing device and said control sequence timer thereby to initiate generation of said first predetermined plural digit code and to initiate operation of said control sequence timer for a predetermined length of time, said control code generator being connected to said control communication channel to transmit a code generated by said control code generator on said control communication channel, said control code receiver also being connected to said control communication channel to receive a code generated by said control code generator and transmitted on said control communication channel, a first code digit responsive device located at said controlled unit connected to said control code receiver to be actuated thereby upon receipt of said first digit of said first and second predetermined plural digit codes at said control code receiver, means connected to said confirmation code generator and associated with said first code digit responsive device to be actuated thereby upon actuation thereof to condition said confirmation code generator for generation of a first confirmation code, a second code digit responsive device located at said controlled unit, means associated with said first code digit responsive device actuated thereby upon actuation thereof to connect said second code digit responsive device to said control code receiver to be actuated thereby upon receipt by said control code receiver of said subsequent digit of said first predetermined plural digit code, said controlled sequence timer having actuating means therefor connected to said control code receiver operable to actuate said controlled sequence timer for the same length of time as said control sequence timer in response to and at the moment of the initial receipt by said control code receiver of any signal on said control communication channel, means connected to said confirmation code generator and associated with said first and second code digit responsive devices to be actuated thereby upon actuation of both to condition said confirmation code generator to generate a second confirmation code, means associated with said controlled sequence timer actuated thereby after the time for reception of said first predetermined plural digit code to initiate operation of said confirmation code generator and to connect said confirmation code generator to said supervisory communication channel to transmit a confirmation code generated by said confirmation code generator on said supervisory communication channel, means associated with said control sequence timer actuated thereby after the time for transmission of said first predetermined plural digit code to connect said confirmation code receiver to said supervisory communication channel thereby communicating said confirmation code generator and confirmation code receiver, alarm means located at said control unit and connected to said confirmation code receiver to be actuated thereby upon receipt by said confirmation code receiver of said first confirmation code, indicating means located at said control unit and connected to said confirmation code receiver to be actuated thereby upon receipt by said confirmation code receiver of said second confirmation code, secondary independent actuating means located at said control unit, means associated with said control sequence timer actuated thereby after the time for reception of said first confirmation code operable in conjunction with said secondary actuating means to actuate said control code generator, said first code establishing device and said second code establishing device thereby to generate and transmit said second predetermined plural digit code on said control communication channel, means associated with said second code digit responsive device to be actuated thereby upon actuation thereof, means associated with said controlled sequence timer actuated thereby during the time for reception of said first plural digit code until after reception of said second plural digit code to hold said second code digit responsive device actuated, a third code digit responsive device located at said controlled unit, means associated with said first code digit responsive device to be actuated thereby upon actuation thereof, said last named means associated with said first code digit responsive device and said last named means associated with said second code digit responsive device being operable upon actuation of both to connect said third code digit responsive device to said control code receiver to actuate said third code digit responsive device upon receipt by said control code receiver of said subsequent digit of said second predetermined plural digit code, means connected to said confirmation code generator and associated with said first, second and third code digit responsive device to be actuated thereby upon actuation of all three to condition said confirmation code generator to generate a second confirmation code, said means associated with said controlled sequence timer for connecting said confirmation code generator to said supervisory communication channel being actuated a second time by said controlled sequence timer after the time for reception of said second predetermined plural digit code, said means associated with said control sequence timer for connecting said confirmation code receiver to said supervisory communication channel being actuated a second time by said control sequence timer after the time for transmission of said second plural digit code, whereby said confirmation code generator and said confirmation code receiver are commonly connected to said supervisory communication channel a second time following transmission and reception of said second predetermined plural digit code, second indicating means located at said control unit and connected to said confirmation code receiver to be actuated thereby upon receipt of said second confirmation code by said confirmation code receiver, and means located at said controlled unit associated with said third code digit responsive device to be actuated thereby upon actuation thereof for performing control functions at said controlled unit.

6. A supervisory remote control system according to claim 5 which further includes false signal detector means associated with said control code receiver to be actuated thereby upon receipt thereof of a signal on said control communication channnel other than said first and second plural digit codes, an alarm generator located at said controlled unit associated with said detector means to be actuated thereby upon actuation thereof to transmit an alarm signal on said supervisory communication channel differing from said confirmation codes, indicating means located at said control unit connected to said supervisory communication channel to be actuated upon receipt of said alarm signal, and lock-out means located at said controlled unit associated with said false signal detector means to be actuated thereby upon actuation thereof to disconnect said control code receiver and said control communication channel.

7. In a supervisory control system including a control code generator, a control code receiver, a confirmation code generator, and a confirmation code receiver, the improvement which includes; a control sequence timer, a controlled sequence timer, a first code establishing device connected to said control code generator and actuatable to condition said cotnrol code generator to generate a first code, a second code establishing device connected to said control code generator and actuatable to condition said control generator to generate a second code, primary independent actuating means for simultaneously actuating said control code generator, said first code establishing device and said control sequence timer thereby to initiate generation of said first code and to initiate operation of said control sequence timer for a predetermined length of time, said control code receiver being connected to said control code generator to receive a code generated by a said control code generator, code responsive means connected to said control code receiver to be actuated thereby upon receipt of said first code at said control code receiver, said controlled sequence timer having actuating means therefor connected to said control code receiver operable to actuate said controlled sequence timer for the same length of time as said control sequence timer in response to and at the moment of the initial receipt of any signal by said control code receiver, means connected to said confirmation code generator and associated with the said code responsive means to actuated thereby upon actuation thereof to condition said confirmation code generator to generate a confirmation code, means associated with said controlled sequence timer actuated thereby after the time for reception of said first code to initiate operation of said confirmation code generator, said confirmation code receiver being connected to said confirmation code generator to receive a confirmation code generated by said confirmation code generator, indicating means located at said control unit and connected to said confirmation code receiver to be actuated thereby upon receipt by said confirmation code receiver of said confirmation code, secondary independent actuating means located at said control unit, means associated with said control sequence timer actuated thereby after the time for reception of said confirmation code operable in conjunction with said secondary actuating means to actuate said control code generator, said first code establishing device and said second code establishing device thereby to generate and transmit said second code to said control code receiver, and means associated with said control code receiver to be actuated thereby upon receipt thereby of said second code of performing control functions.

8. In a supervisory control system including a control unit, a controlled unit and a communication channel between said units, the improvement which includes; a control code generator located at said control unit operable when actuated to generate a plural digit code in the form of groups of pulses including a bank of contacts, means for scanning said contacts sequentially and an output circuit connecting said scanning means and said communication channel, a first code establishing device located at said control unit operably connected to certain of said contacts in said bank and actuatable to energize said contacts by said scanning means such that the signal in said output circuit includes a first group of pulses spaced from a subsequent group of pulses whereby when said code establishing device is actuated and said scanning means is operated said output circuit of said code generator will be energized as said scanning means scans each of said certain contacts thereby to generate in said output circuit a plural digit code signal in the form of groups of pulses corresponding to the sequential contact of said scanning means and said certain contacts, means for simultaneously actuating said scanning means and said code establishing device, a control code receiver located at said controlled unit having an input circuit connected to said control communication channel and having a plurality of output circuits, a first said output circuit being actuatable upon receipt of a group pulses in said input circuit corresponding in number to the number of pulses in the first digit of said plural digit code and a second output circuit actuatable upon receipt of a number of pulses corresponding to the number of pulses in said plural digit code through a subsequent digit of said code, a first code digit responsive device located at said controlled unit connected to said first output circuit of said control code receiver to be actuated by said first output circuit upon actuation thereof, a second code digit responsive device located at said controlled unit, means associated with said first code digit responsive device actuated thereby upon actuation thereof to connect said second code digit responsive device to said second output circuit of said code receiver to actuate said second code responsive device upon actuation of said second output circuit, and means located at said controlled unit associated with said second code digit responsive device to be actuated thereby upon actuation thereof for performing functions at said controlled unit.

9. The improvement according to claim 8 in which said controlled unit is further provided with means for disconnecting said input circuit of said code receiver and said communications channel upon actuation of said second code digit device until completion of the function initiated by said first named means associated with said second code digit responsive device.

10. The improvement according to claim 8 in which said code receiver includes; a bank of contacts and scanning means operably connected to the input circuit of said code receiver for sequentially scanning each said contact at a time for each pulse in said communications channel, in which said first output circuit is connected to the contact removed from a predetermined initial position of said scanning device a number of contacts numerically equal to the first digit of said code, in which said second output circuit is connected to the contact of said bank removed from the initial position of said scanning device a number of contacts numerically equal to the total digits of said code through said subsequent digit, in which said receiver is further provided with a third output circuit connected to each of said contacts in said bank not corresponding to a terminal pulse of a digit of said code, means associated with said scanning means for completing each said output circuit as said scanning means scans the contact to which such output circuit is connected, means associated with said last named means connected to said communications channel to be actuated during a series of pulses in said channel to disable said last named means, and means connected to said third output circuit to be actuated thereby upon actuation thereof to disconnect said code receiver and said communication channel, 11. In a supervisory control system including a controlled unit the improvement which includes; a control code receiver located at said controlled unit, a confirmation code generator located at said controlled unit, a first code digit responsive device located at said controlled unit connected to said control code receiver to be actuated thereby upon receipt of a first digit of a first and second predetermined plural digit code having a common first digit and a differing subsequent digit, a second code digit responsive device located at said controlled unit, means associated with said first code digit responsive device actuated thereby upon actuation thereof to connect said second code digit responsive device to said control code receiver to be actuated thereby upon receipt by said control code receiver of said subsequent digit of said first predetermined plural digit code, means connected to said confirmation code generator and associated with said first and second code digit responsive devices to be actuated thereby upon actuation of both to condition said confirmation generator to generate a first confirmation code, means associated with said second digit code responsive device to be actuated thereby upon actuation thereof and remaining actuated after release of said second code digit responsive device, a third code digit responsive device located at said controlled unit, means associated with said first code digit responsive device to be actuated thereby upon actuation thereof, said last named means associated with said first code digit responsive device and said last named means associated with said second code digit responsive device being operable upon actuation of both to connect said third code digit responsive device to said control code receiver to actuate said third code digit responsive device upon receipt by said control code receiver of said subsequent digit of said second predetermined plural digit code, and means connected to said confirmation code generator and associated with said first, second and third code digit responsive device to be actuated thereby upon actuation of all three to condition said confirmation code generator to generate a second confirmation code.

References Cited by the Examiner

UNITED STATES PATENTS

| | | | |
|---|---|---|---|
| 1,882,404 | 10/1932 | Sorensen | 340—345 |
| 1,929,669 | 10/1933 | Arter | 340—163 |
| 2,276,646 | 3/1942 | Boswau | 340—163 |
| 2,326,388 | 8/1943 | Obergfell | 340—345 |
| 2,344,231 | 3/1944 | Burns | 340—163 |
| 2,384,558 | 9/1945 | Potts | 340—345 |
| 2,584,739 | 2/1952 | Rees et al. | 340—163 |
| 2,616,959 | 11/1952 | Breese et al. | 340—163 |
| 2,623,939 | 12/1952 | Derr | 340—163 |
| 2,690,553 | 9/1954 | Dale | 340—345 |
| 2,906,822 | 9/1959 | Schultheis | 340—345 |

NEIL C. READ, *Primary Examiner.*

IRVING L. SRAGOW, *Examiner.*